US011273778B1

(12) United States Patent
Lakhani et al.

(10) Patent No.: US 11,273,778 B1
(45) Date of Patent: *Mar. 15, 2022

(54) VEHICLE VOICE USER INTERFACE

(71) Applicant: Amazon Technologies, Inc., Seattle, WA (US)

(72) Inventors: Hamza Lakhani, Sunnyvale, CA (US); Thomas Schaaf, Pittsburgh, PA (US); Leah Rose Nicolich-Henkin, Pittsburgh, PA (US); Ricardo DeMatos, Duxbury, MA (US); Mingzhi Yu, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/808,022

(22) Filed: Nov. 9, 2017

(51) Int. Cl.
| | |
|---|---|
| *B60R 16/03* | (2006.01) |
| *B60R 16/037* | (2006.01) |
| *G06F 3/16* | (2006.01) |
| *G06K 9/00* | (2022.01) |
| *G10L 13/10* | (2013.01) |
| *G10L 13/033* | (2013.01) |
| *G10L 15/30* | (2013.01) |
| *G10L 25/63* | (2013.01) |
| *G10L 15/22* | (2006.01) |
| *G06N 20/00* | (2019.01) |

(52) U.S. Cl.
CPC .......... *B60R 16/0373* (2013.01); *G06F 3/167* (2013.01); *G06K 9/00805* (2013.01); *G06N 20/00* (2019.01); *G10L 13/0335* (2013.01); *G10L 13/10* (2013.01); *G10L 15/22* (2013.01); *G10L 15/30* (2013.01); *G10L 25/63* (2013.01); *G06K 2209/27* (2013.01); *G10L 2015/223* (2013.01)

(58) Field of Classification Search
CPC ... G10L 15/22; G10L 2015/223; G10L 15/30; G10L 2015/228; G10L 13/043; G10L 15/02; G10L 13/00; G10L 15/00; G06K 9/00845; G06K 9/00302
See application file for complete search history.

(56) References Cited

U.S. PATENT DOCUMENTS

| | | | |
|---|---|---|---|
| 9,858,832 B1* | 1/2018 | Hsu-Hoffman | G09B 19/167 |
| 10,241,509 B1* | 3/2019 | Fields | A61B 5/4094 |
| 2005/0060158 A1* | 3/2005 | Endo | G10L 15/22 |
| | | | 704/275 |
| 2012/0133515 A1* | 5/2012 | Palshof | G08B 21/06 |
| | | | 340/575 |

(Continued)

*Primary Examiner* — Mark Villena
(74) *Attorney, Agent, or Firm* — Pierce Atwood LLP

(57) ABSTRACT

Techniques for engaging a drowsy or otherwise impaired driver of a vehicle in a VUI dialog are described. A vehicle computing system sends data (e.g., raw sensor data and/or an indication that a driver is impaired determined based on the raw sensor data) to a remote server(s). The remote server(s) may separately determine whether the driver is impaired based on the raw sensor data and/or other contextual data. The remote server(s) selects a speechlet to provide output data based on the sensor data, contextual data, and or a level at which the driver is impaired. The remote server(s) then causes the vehicle computing system to present output audio corresponding to output data provided by the speechlet.

26 Claims, 14 Drawing Sheets

(56) References Cited

U.S. PATENT DOCUMENTS

| | | | | |
|---|---|---|---|---|
| 2014/0148972 A1* | 5/2014 | Basir | G07C 5/008 | |
| | | | 701/1 | |
| 2014/0276090 A1* | 9/2014 | Breed | A61B 5/14546 | |
| | | | 600/473 | |
| 2014/0303966 A1* | 10/2014 | Adachi | H04M 1/6075 | |
| | | | 704/201 | |
| 2015/0088335 A1* | 3/2015 | Lambert | G08G 1/162 | |
| | | | 701/1 | |
| 2015/0351702 A1* | 12/2015 | Kono | A61B 5/18 | |
| | | | 600/549 | |
| 2015/0375756 A1* | 12/2015 | Do | B60W 50/14 | |
| | | | 701/1 | |
| 2016/0104486 A1* | 4/2016 | Penilla | H04L 67/12 | |
| | | | 704/232 | |
| 2016/0128619 A1* | 5/2016 | Geller | A61B 5/6803 | |
| | | | 600/595 | |
| 2016/0311440 A1* | 10/2016 | Gan | G08B 21/06 | |
| 2016/0371977 A1* | 12/2016 | Wingate | B60W 50/16 | |
| 2017/0068994 A1* | 3/2017 | Slomkowski | G06Q 30/0269 | |
| 2017/0083933 A1* | 3/2017 | Sakurai | G06Q 30/0242 | |
| 2017/0116986 A1* | 4/2017 | Weng | G10L 15/22 | |
| 2017/0144671 A1* | 5/2017 | Memani | B60W 40/09 | |
| 2017/0235361 A1* | 8/2017 | Rigazio | B60K 35/00 | |
| | | | 715/710 | |
| 2017/0291543 A1* | 10/2017 | Goldman-Shenhar | B60Q 9/00 | |
| 2018/0022357 A1* | 1/2018 | Mori | G08B 25/08 | |
| | | | 280/735 | |
| 2018/0075380 A1* | 3/2018 | Perl | G06Q 10/0635 | |
| 2018/0122259 A1* | 5/2018 | Arquero | G09B 19/167 | |
| 2018/0134116 A1* | 5/2018 | Chen | B60H 1/00764 | |
| 2018/0174457 A1* | 6/2018 | Taylor | G08G 1/096716 | |
| 2018/0186234 A1* | 7/2018 | Mestha | G06K 9/209 | |
| 2018/0196427 A1* | 7/2018 | Majumdar | G05D 1/0088 | |
| 2018/0204570 A1* | 7/2018 | Puranik | G10L 15/22 | |
| 2018/0204572 A1* | 7/2018 | Manabe | G10L 15/22 | |
| 2018/0204573 A1* | 7/2018 | Iwasa | G10L 15/22 | |
| 2018/0260641 A1* | 9/2018 | Yadhunandan | G06K 9/00845 | |

* cited by examiner

VEHICLE VOICE USER INTERFACE

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of automatic speech recognition processing and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
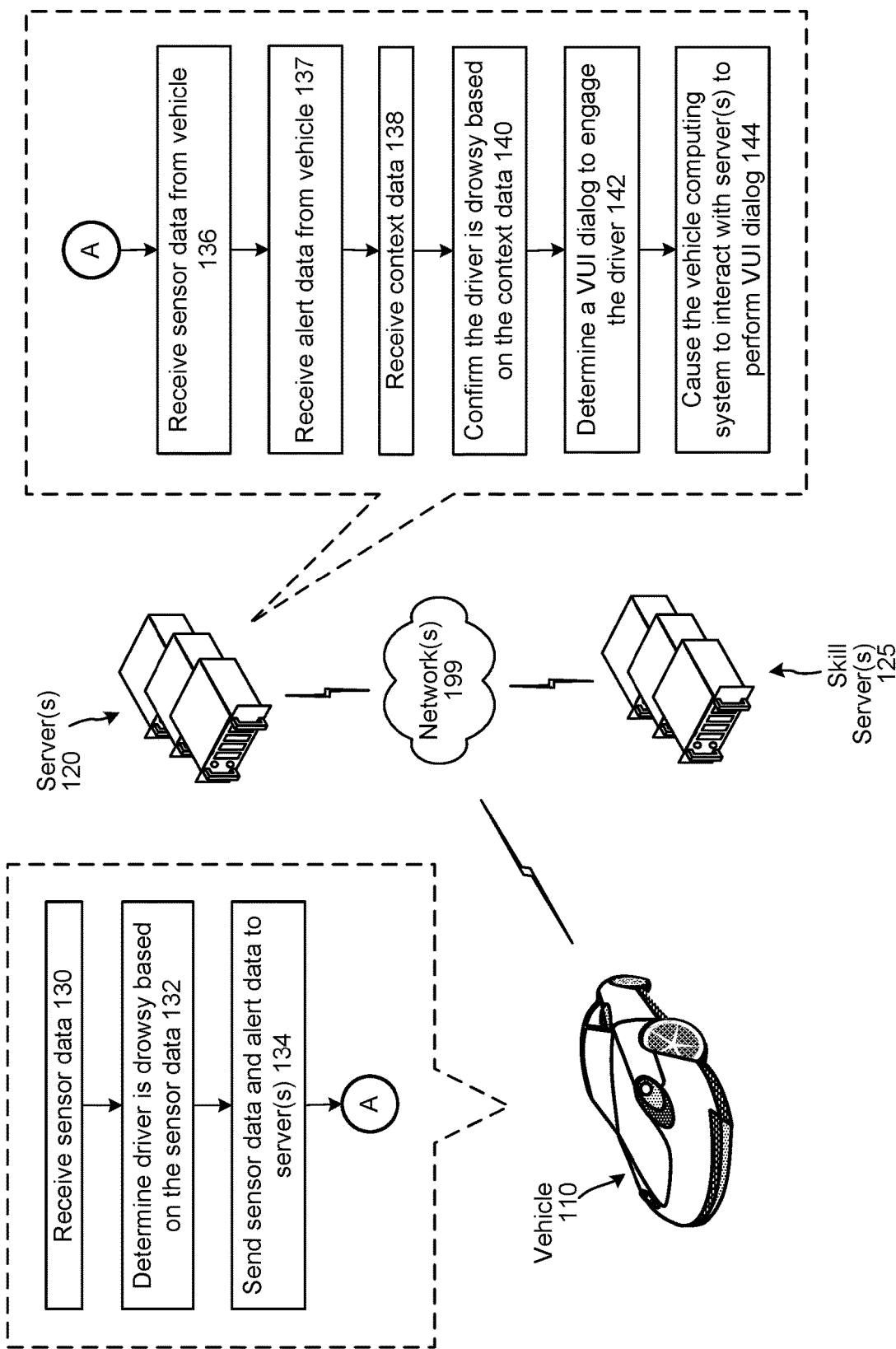
FIG. 1 illustrates a system configured to detect driver drowsiness and engage the driver in a VUI dialog according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. The combination of ASR and NLU may be referred to herein as speech processing.

Speech processing may be used in a variety of contexts, including allowing voice control of systems where touch control may not be available or preferred. For example, a system may allow voice control of a system while a user is operating a vehicle. One category of tasks that relates to voice control by an operator of a vehicle relates to a primary driving operation of a vehicle or supervision of a vehicle engaged in autonomous (or semi-autonomous) driving operations. Another category of tasks that relates to voice control by an operator of a vehicle relates to secondary operations that may be performed during operation of a vehicle, such as navigation, making calls, listening to music, etc.

Vehicles are increasingly being equipped with various sensors to aid a driver in the aforementioned former category of tasks (e.g., driving a vehicle or supervising the driving of a self-driving vehicle). One of those tasks may be safe operation of the vehicle. For example, a vehicle may be equipped with one or more sensors that enable the vehicle to determine when the vehicle is inadvertently drifting between lanes of a road. For further example, a vehicle may be equipped with one or more sensors that enable the vehicle to detect the proximity of another vehicle and automatically apply the vehicle's brakes in certain instances. Based on the output of those sensors, a vehicle may output a warning beep or other indicator to attempt to capture the user's attention and may result in an otherwise inattentive driver becoming re-engaged with operation of a vehicle.

Voice systems may be used to engage unfocused (e.g., drowsy, inebriated, or under the influence, or otherwise impaired) drivers of vehicles. "Drivers" or "driver" as used herein refers to individuals that are operating a moving vehicle as well as operating a stationary vehicle. Teachings of the present disclosure improve upon certain driver assistance systems by enabling a vehicle and networked system to collaboratively determine when a driver may be unfocused (for example drowsy, distracted, impaired, or otherwise exhibiting characteristics of not sufficiently concentrating on driving). The system may separately confirm that the driver is unfocused and engage the driver in a specific voice user interface (VUI) dialog. A vehicle may be equipped with various sensors. A system within the vehicle may process information provided by the various vehicle sensors to determine when the driver of the vehicle is impaired (or otherwise disengaged from adequately operating the vehicle). The system within the vehicle sends an indication of driver drowsiness, and optionally the sensor information underlying the drowsiness determination, to a remote system.

The remote system performs processing to confirm or invalidate the vehicle system's determination that the driver is drowsy. The remote system may perform such using information unavailable to the vehicle's system, and optionally using the information provided by the vehicle's system.

If the remote system confirms the vehicle system's determination that the driver is drowsy, the remote system may select a VUI dialog most appropriate for re-engaging the driver in operation of the vehicle. Such selection of the VUI dialog may be based on a determined category of drowsiness experienced by the driver. Moreover, the determined category of drowsiness may be used to select parameters for synthesize computer speech that will ultimately be output to the driver as part of the VUI dialog.

FIG. 1 illustrates a system configured to detect driver drowsiness and engage the driver in a VUI dialog. As illustrated in FIG. 1 a vehicle 110, one or more servers 120, and one or more skill servers 125 may be connected across one or more networks 199. A vehicle 110 as used herein may refer to a car, truck, SUV, plane, boat, motorcycle, crane, or the like. A "driver" as used herein refers to an operator of a vehicle, regardless of whether the vehicle is in motion.

"Drowsy," "impaired," or the like as used herein refers to a condition of a driver whereby the driver is unable to fully and adequately operate a vehicle.

A computing system of the vehicle 110 may receive (130) sensor data from various sensors incorporated in an exterior and/or interior of the vehicle. Such sensors may include image or video sensors such as camera, audio sensors such as microphones, proximity sensors, and the like. The computing system of the vehicle 110 may process the sensor data to determine (132) a driver of the vehicle is drowsy. Such determination may be based on the sensor data representing one or more of the vehicle inadvertently drifting between lanes of a road, the driver's eyes are closed or blinking over extended periods of time, the driver is slurring their speech, etc. If the computing system of the vehicle 110 determines the driver is drowsy, the computing system of the vehicle 110 may send (134) the sensor data and alert data (e.g., an indication of driver drowsiness) to the server(s) 120. Alert data may be generated by the vehicle 110 using sensor data (generated by sensors of the vehicle 110) representing the vehicle's physical actions resulting from input by an operator. The computing system of the vehicle 110 may send the sensor data and the alert data to the server(s) 120 via a companion application that is implemented in the vehicle's computing system and in communication with the server(s) 120 via the network(s) 199 (e.g., the Internet).

The server(s) 120 receives (136) the sensor data 913 from the vehicle 110 (e.g., from the vehicle's computing system or a companion application implemented therein). The server(s) 120 also receives (137) the alert data 915 of driver drowsiness from the vehicle 110. The server(s) 120 also receives (138) context data. The context data may be unavailable to the vehicle's computing system. For example, the context data may correspond to cell phone usage data received from a cellular service provider associated with a phone represented in a user profile associated with the driver. The server(s) 120 may use the context data, and optionally the sensor data, to confirm (140) the driver is drowsy. For example, if cell phone usage data represents the driver recently (e.g., with a threshold length of time) sent a message or email, the server(s) 120 may determine the driver is not drowsy but, instead, was temporarily distracted. Conversely, if cell phone usage data represents the driver has not used their phone recently, the server(s) 120 may determine the driver was not temporarily distracted but, rather, is drowsy.

If the server(s) 120 confirms the driver is drowsy, the server(s) 120 may determine (142) a VUI dialog most appropriate for re-engaging the driver in operating the vehicle 110. For example, a VUI dialog may engage the driver to provide license plate information of a vehicle in front of the vehicle 110 on the road, provide information relating to a street sign in front of the vehicle 110, or provide other information relating to the vehicle's surroundings, such as which establishment is located at a next intersection. For further example, the VUI dialog may solicit the driver regarding whether the driver would like to partake in a VUI trivia game. For yet further example, the VUI dialog may solicit the driver regarding whether the driver would like to make a hands-free telephone call via the VUI. The server(s) 120 then causes (144) the vehicle's computing system to interact with the server(s) 120 to perform the VUI dialog with the driver.

A "dialog" or "VUI dialog" as used herein may refer to data transmissions between the server(s) 120 and the computing system of the vehicle 110 that all relate to a single computer-orchestrated conversation. Thus, the data transmissions of a dialog may share a dialog ID or other unique identifier that may be used by components of the system to track information across the dialog. For example, the server(s) 120 may send the computing system of the vehicle 110 first output audio data corresponding to "what state is the vehicle in front of you from?" The computing system of the vehicle 110 may send the server(s) 120 first input audio data corresponding to "Washington." The server(s) 120 may thereafter send the computing system of the vehicle 110 second output audio data corresponding to "what street sign is up ahead on your left?" The computing system of the vehicle 110 may send the server(s) 120 second input audio data corresponding to "a merge left sign." The sending of the first and second output audio data from the server(s) 120 the computing system of the vehicle 110, and the sending of the first and second input audio data from the computing system of the vehicle 110 to the server(s) 120, may all correspond to a single dialog related to the same computer-orchestrated conversation for re-engaging the driver in operating the vehicle 110. Each utterance, spoken by the driver, of a dialog may be associated with a unique utterance ID such that multiple utterance IDs may be associated with a single dialog ID.

The server(s) 120 may communicate with one or more speechlets, which are implemented as part of the server(s) 120, and/or one or more skill servers 125, which execute one or more skills, to perform the determined VUI dialog. A VUI dialog may receive content from a single speechlet, or a single VUI dialog may receive content from multiple speechlets.

A "speechlet" may be software running on the server(s) 120 that is akin to a software application running on a traditional computing device (e.g., a smart phone or tablet). That is, a speechlet may enable the server(s) 120 to execute specific functionality in order to provide data or produce some other output to a user. The server(s) 120 may be configured with more than one speechlet. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, a trivia speechlet may enable the server(s) 120 to engage a user in a trivia game, a communications speechlet may enable the server(s) 120 to send a message or facilitate a communication (e.g., 2-way call, conference call, etc.), etc. A speechlet may operate in conjunction between the server(s) 120 and other devices such as the vehicle 110 in order to complete certain functions. Inputs to a speechlet may originate from speech processing performed by the server(s) 120 or through other interactions or input sources.

A speechlet may include a "skill." A skill may be software running on a skill server(s) 125 that is akin to a software application running on a traditional computing device (e.g., a smart phone or tablet). That is, a skill may enable the skill server(s) 125 to execute specific functionality in order to provide data or produce some other output to a user. The system may be configured with one or more skill servers 125. Each skill server 125 may be configured with one or more skills. Moreover, each skill may be associated with one or more skill servers 125. For example, a weather service skill may enable the skill server(s) 125 to provide weather information to the server(s) 120, a car service skill may enable the skill server(s) 125 to book a trip with respect to a taxi or ride sharing service, an order pizza skill may enable the skill server(s) 125 to order a pizza with respect to a restaurant's online ordering system, a trivia skill may enable the skill server(s) 125 to provide trivia data to the server(s) 120, a communications skill may enable the skill server(s) 125 to send a message or facilitate a communication (e.g., 2-way call, conference call, etc.), etc. A skill may operate in conjunction between the skill server(s) 125 and other devices such as the server(s) 120 or local device 110 in order to complete certain functions. Inputs to a skill may originate from speech processing performed by the server(s) 120 or through other interactions or input sources.

The system may include a speechlet configured to check the drowsiness of a driver and engage/awaken the driver as described herein.

A speechlet may be operated by a speechlet device (e.g., a component of the server(s) 120 or skill server(s) 125).

The system may send data indicating an operator of a vehicle is unfocused to a vehicle speechlet. The data indicating the operator is unfocused may include vehicle identifying information and/or operator identifying information. The vehicle speechlet may call another speechlet (e.g., a trivia speechlet) to engage in a VUI dialog with the operator. The system may receive data indicating which speechlet the vehicle speechlet called. When the system determines the called speechlet is finished engaging with the operator (or when the system receives data indicating same), the system may send data to the vehicle speechlet indicating same. The vehicle speechlet may then perform processes described herein to further evaluate the whether the operator is unfocused. The vehicle speechlet may close a current processing session if the vehicle speechlet determines the operator is no longer unfocused (or unfocused below a threshold level). Alternatively, if the vehicle speechlet determines the operator is still unfocused, the vehicle speechlet may call another speechlet (of the same previously called speechlet) to further engage the operator.

Figure 2:
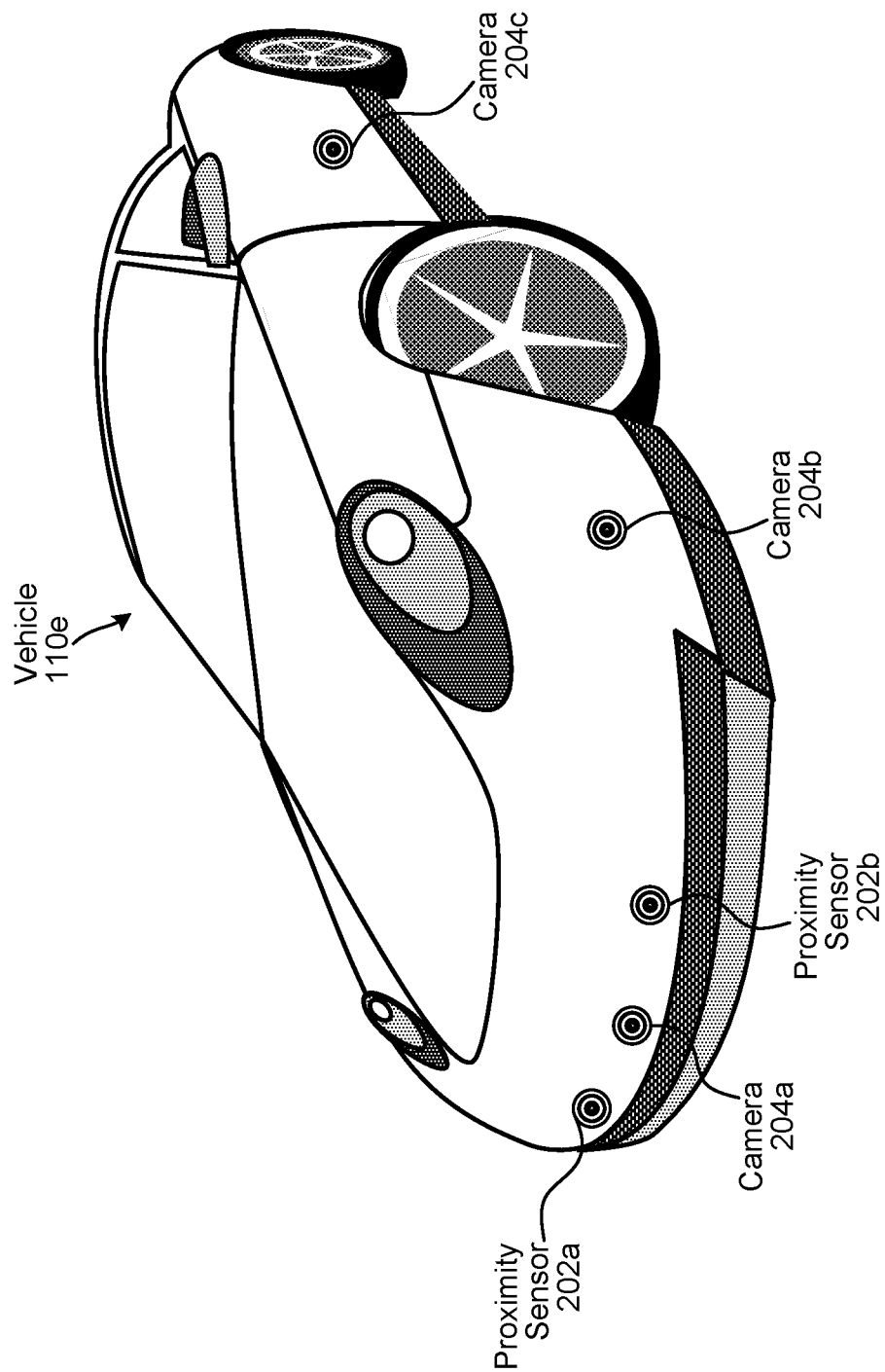
FIG. 2 illustrates an exterior of a vehicle including various sensors according to embodiments of the present disclosure.

FIG. 2 illustrates an exterior of a vehicle 110 including various sensors that may provide sensor data to the vehicle's computing system. The exterior of the vehicle 110 may include various sensors and such sensors may be positioned at various locations on the exterior of the vehicle 110 to capture desired information. For example, one or more proximity sensors 202 may be located on a front bumper of the vehicle 110. The proximity sensors 202 may provide the vehicle's computing system with proximity data representing a proximity of an object to the front bumper of the vehicle 110. For further example, one or more cameras 204 may be located on the exterior of the vehicle 110. As illustrated, the vehicle 110 may include a first camera 204a located on a front portion of the front bumper of the vehicle 110, a second camera 204b located on a side portion of the front bumper of the vehicle 110, and a third camera 204c located on a door panel of the vehicle 110. The first camera 204a may provide the vehicle's computing system with image data representing one or more images corresponding to a front exterior environment of the vehicle 110. The second camera 204b may provide the vehicle's computing system with image data representing one or more images corresponding to a partial front/partial side exterior environment of the vehicle 110. The third camera 204c may provide the vehicle's computing system with image data representing one or more images corresponding to a side exterior environment of the vehicle 110. An "environment of the vehicle" as used herein refers to the surroundings or conditions in which the vehicle 110 is operating. One skilled in the art should appreciate that the sensors (202/204) illustrated in FIG. 2 are merely illustrative and that an exterior of a vehicle 110 may include different, more, or fewer sensors than that illustrated in FIG. 2 without departing from the present disclosure.

Figure 3:
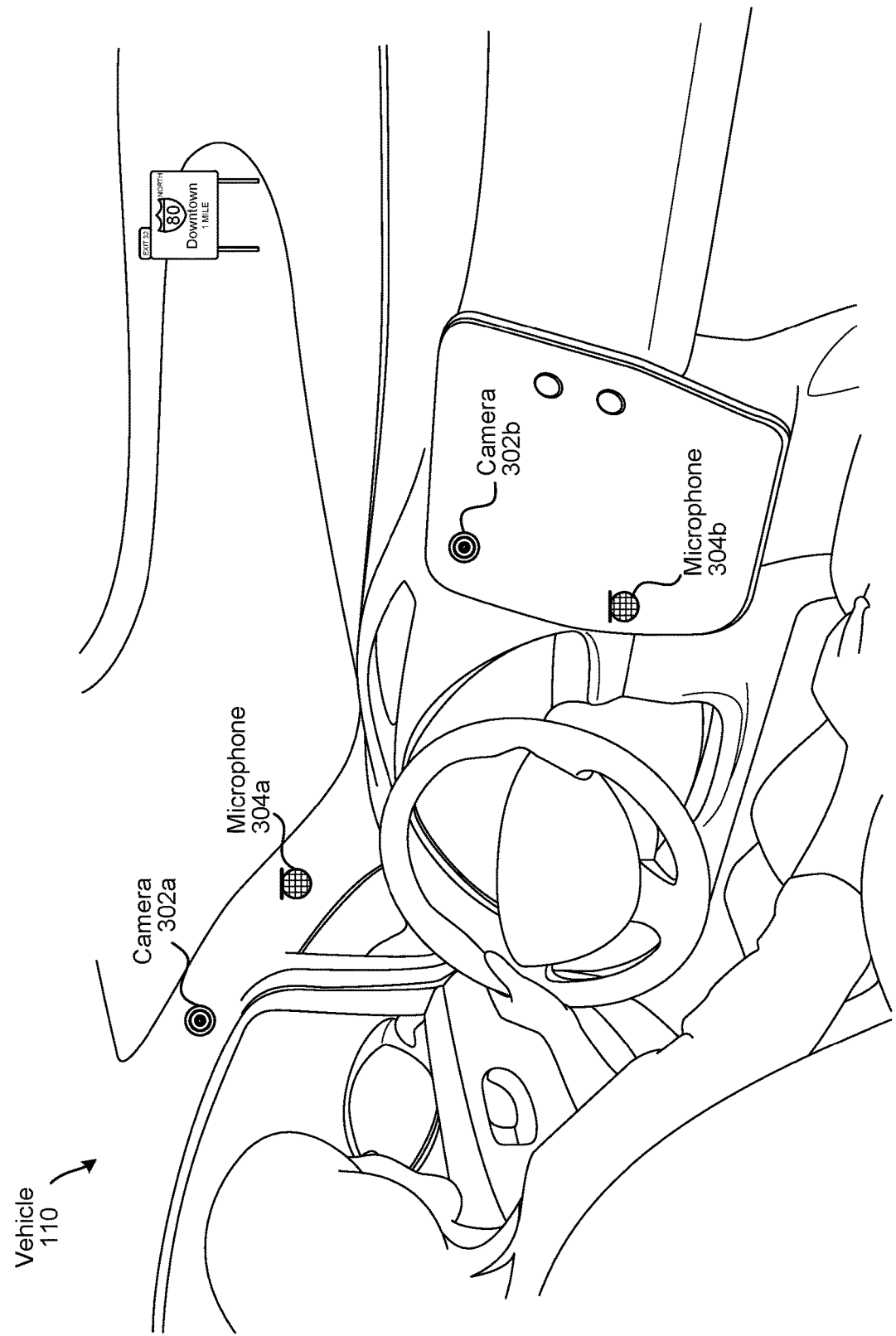
FIG. 3 illustrates an interior of a vehicle including various sensors according to embodiments of the present disclosure.

FIG. 3 illustrates an interior of a vehicle 110 including various sensors that may provide sensor data to the vehicle's computing system. The interior of the vehicle 110 may include various sensors and such sensors may be positioned at various locations on the interior of the vehicle 110 to capture desired information. For example, one or more cameras 302 may be located on the interior of the vehicle 110. As illustrated, the vehicle 110 may include a first camera 302a located on an A pillar of the vehicle 110 and a second camera 302b located on a center console of the vehicle 110. The cameras 302 may provide the vehicle's computing system with image data representing one or more images corresponding to views of the driver. For further example, one or more microphones 304 may be located on the interior of the vehicle 110. As illustrated, the vehicle 110 may include a first microphone 304a located on the A pillar of the vehicle 110 and a second microphone 304b located on the center console of the vehicle 110. The microphones 304 may provide the vehicle's computing system with audio data. One skilled in the art should appreciate that the sensors (302/304) illustrated in FIG. 3 are merely illustrative and that an interior of a vehicle 110 may include different, more, or fewer sensors than that illustrated in FIG. 3 without departing from the present disclosure.

Figure 4:
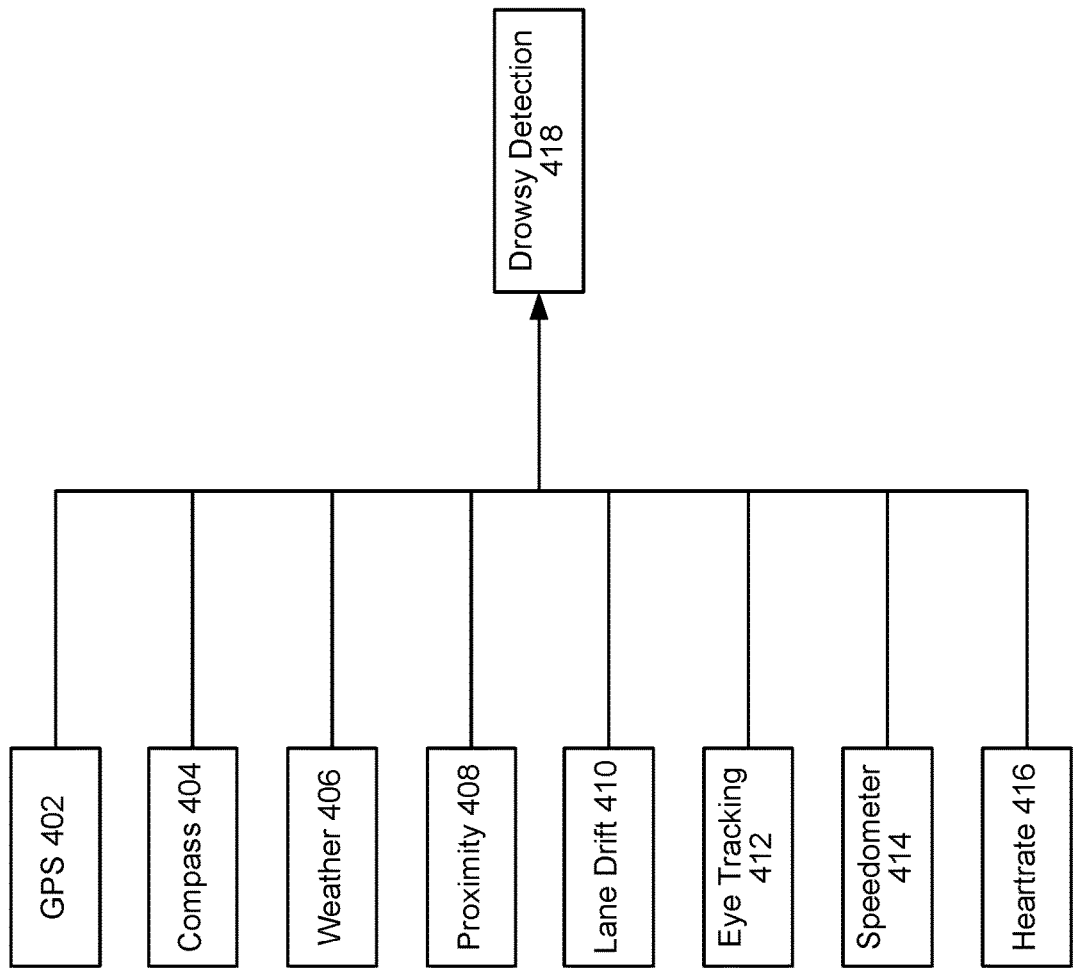
FIG. 4 is a conceptual diagram of components of a vehicle computing system according to embodiments of the present disclosure.

FIG. 4 illustrates components of a vehicle computing system. The vehicle computing system may include a global positioning system (GPS) 402 that communicates with a satellite or some other global positioning locator to provide data indicating a global position of the vehicle 110. The computing system may also include a compass 404 that provides data indicating a directional heading of the vehicle 110. The vehicle computing system may also include a weather component 406 that compiles data from one or more weather sensors, such as barometric pressure sensors, temperature sensors, wind speed sensors, wind direction sensors, rain sensors, etc., that measure weather-related data regarding the environment of the vehicle 110. Sensors of the weather component 406 may be physically located on the car (such as a rain sensor) and/or may receive weather related data from remote sources (such as a weather service).

The vehicle computing system may also include a proximity component 408. The proximity component 408 may receive proximity data from one or more proximity sensors 202 located on an exterior of the vehicle 110. The proximity component 408 may process proximity data to determine when an object is within a threshold distance from the front of the vehicle 110. The proximity component 408 may also process the proximity data to determine a rate of speed at which the vehicle 110 is approaching and object, and vice versa. The proximity component 408 may output data when the proximity component 408 determine proximity data indicates the vehicle 110 is approaching an object at an unsafe rate of speech and/or when the proximity data indicates the vehicle 110 is within a threshold distance from an object.

The vehicle computing system may also include a lane drift component 410. The lane drift component 410 may receive image data from one or more cameras 204 located on an exterior of the vehicle 110. The lane drift component 410 may process image data to determine representations of lines painted on a roadway (e.g., a center line, a shoulder line, etc.). The lane drift component 410 may process image data as it is received from the camera(s) 204 (e.g., on a continuous basis if the image data is continuously streamed to the lane drift component 410 or on a routine but non-continuous basis if the image data is sent to the lane drift component 410 at regular intervals of time) to determine when the vehicle is crossing a line painted on a roadway. The lane drift component 410 may also take as input data indicating when a turn signal of the vehicle is activated as well as data indicating degree at which the vehicle's tires are turned with respect to an axle (representing how sharp the vehicle is turning). The lane drift component 410 may also determine how sharp the vehicle 110 is turning based on how fast a representation of the line on the road moves in image data received from one or more cameras 204. The lane drift component 410 may determine whether the vehicle is drifting, as compared to being purposefully turned by the driver, based on all the data input therein. For example, the lane drift component 410 may determine the driver is purposefully turning the vehicle when image data indicates the vehicle is crossing a line painted on a road and other data indicates the vehicle's turn signal is activated. Conversely, the lane drift component 410 may determine the vehicle 110 drifting when image data indicates the vehicle is crossing a line painted on a road, and other data indicates the vehicle's turn signal is deactivated and the vehicle's tires are only slightly turned.

The vehicle computing system may also include an eye tracking component 412. The eye tracking component 412 may receive image data from one or more cameras 302 located on an interior of the vehicle 110. The image data may include representations of the driver's face. The eye tracking component 412 may process the image data, using techniques known in the art, to determine representations of the driver's eyes. The eye tracking component 412 may perform such processing overtime to determine whether the user's eyes are open or closed, how often the user is blinking, and/or how long each blink of the user's eyes lasts.

The vehicle computing system may also include a speedometer 414. The speedometer 414 may determine a ground speed at which the vehicle 110 is traveling as well as determine an acceleration or deceleration rate of the vehicle 110. The speedometer 414 may communicate with the GPS component 402. For example, the GPS component 402 may determine a global position of the vehicle 110 and determine a speed limit associated with the global position. The GPS component 402 may provide data indicating the speed limit to the speedometer 414. The speedometer 414 may monitor the vehicle's ground speed in conjunction with the speed limit to determine when the vehicle's ground speed falls below the speed limit.

The vehicle computing system may also include a heartrate component 416. The heartrate component 416 may receive image data from one or more cameras 302 located on an interior of the vehicle 110. The camera(s) 302 may be configured to detect heat signatures such that the heartrate component 416 may process image data received from the camera(s) 302 overtime to determine a pulse of the driver. Alternatively, the heartrate component 416 may receive data from a wearable device (e.g., a smart watch) that communicates (e.g., via Bluetooth) data to the heartrate component 416 representing a pulse of the driver.

A component of the vehicle computing system may also receive image data from one or more cameras 302 located on an interior of the vehicle 110, process the image data (using techniques known in the art) to determine a representation of the driver, and monitor the representation over time to determine when the driver performs a stretching gesture.

The vehicle computing system includes a drowsy detection component 418. The drowsy detection component 418 processes sensor data received from sensors of the vehicle 110 (explicitly recited herein and others) to determine whether the driver is drowsy. The drowsy detection component 418 may implement one or more trained models to determine whether the driver is drowsy. If the drowsy detection component 418 determines the driver is drowsy, the drowsy detection component 418 outputs alert data.

The drowsy detection component 418 may continuously process received to determine whether a driver is drowsy, but only send sensor data and/or alert data to the server(s) 120 when the drowsy detection component 418 actually determines the driver is drowsy. Thus, when the drowsy detection component 418 determines a driver is drowsy, such determination may be considered a "waking" trigger event that causes data transmission to the server(s) 120.

The drowsy detection component 418 may also send alert data (e.g., an indication that the driver is drowsy) to the server(s) 120 after the vehicle 110 has been continuously (or substantially continuously) driven for a threshold period of time (e.g., a threshold number of hours with minimal to no stops of a threshold length of time). Such alert data may cause the server(s) 120 to engage the driver in a VUI dialog without the server(s) 120 first confirming the driver is drowsy.

The drowsy detection component 418 may send data to the server(s) 120 via wireless communications and/or communications involving a cellular service provider. Additionally, the drowsy detection component 418 may be configured to send data to the server(s) 120 using non-wireless and non-cellular service provider communications to prevent situations where the drowsy detection component 418 determines the driver is drowsy but nonetheless cannot transmit data to the server(s) 120 because there are no wireless or cellular service provider communication signals available.

One or more models implemented by components of the system disclosed herein may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The trained models implemented by various components of the herein disclosed system may be trained with respect to general human driving drowsiness in the first instance. The trained models may be retrained specific to users of the system over time as driving behavior and other driving relevant behavior of the user becomes available to the system.

Figure 5:
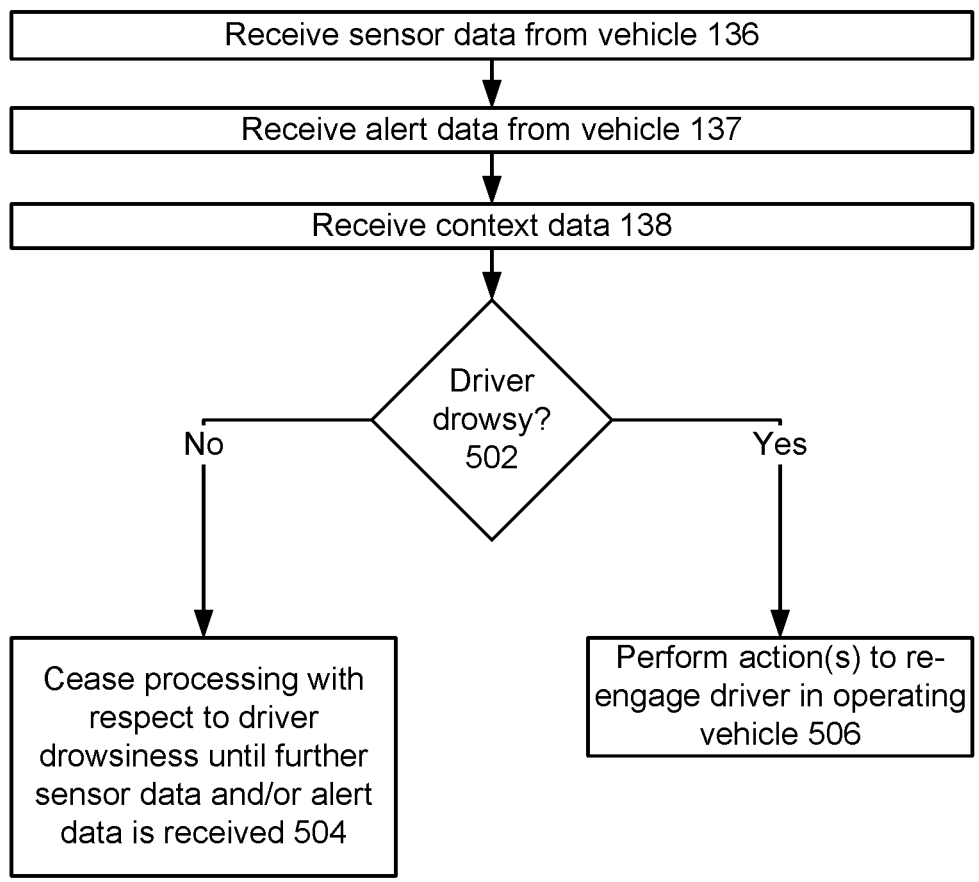
FIG. 5 is a process flow diagram illustrating how a system may confirm a driver is drowsy according to embodiments of the present disclosure.

FIG. 5 illustrates how a system may confirm a driver is drowsy. The server(s) 120 receives (136) sensor data from the vehicle computing device. The server(s) 120 may also receive (137) data indicating a driver is drowsy from the vehicle computing system, and more specifically the drowsy detection component 418. The server(s) 120 also receives (138) context data, which may be unavailable to the drowsy detection component 418 even though the context data may be available to one or more other components of the vehicle computing system. The server(s) 120 determines (502) whether the driver is drowsy based at least in part on the context data. For example, the server(s) 120 may determine whether the driver is drowsy based solely on the context data or based on the context data in conjunction with the received sensor data. Moreover, the server(s) 120 may determine whether the driver is drowsy based solely on the context data and/or sensor data, or the server(s) 120 may only determine whether the driver is drowsy in response to receiving alert data. The server(s) 120 may implement one or more trained models to determine whether a driver is drowsy. The trained model(s) may weight data differently depending on the amount and type of data processed thereby.

The context data may include some or all the sensor data described herein above. Moreover, the server(s) 120 may perform some or all of the determinations described herein above with respect to the drowsy detection component 418 as part of the server(s) 120 determining whether the driver is drowsy. When the server(s) 120 makes drowsiness determinations using context data that may be available to the drowsy detection component 418 in various instances, data corresponding to such determinations of the server(s) 120 may be used to retrain one or more trained models implemented by the drowsy detection component 418.

The context data may also represent a time of receipt of the sensor data and the alert data. Alternatively, the context data may represent a current time experienced by the vehicle 110. The data representing the time of receipt or current time may be adjusted to account for the geographic location of the vehicle since processing performed by the server(s) 120 may occur in a different time zone than where the vehicle 110 is located. Such data may be useful in determining whether a driver is drowsy because drivers may have more of a tendency to be drowsy in the evening/night that in the morning/afternoon.

The context data may also represent speech of the driver. When the server(s) 120 receives the sensor data and the alert data from the vehicle computing system, the server(s) 120 may send an instruction to stream or otherwise send, to the server(s) 120 audio data received from one or more microphones 304 located on the interior of the vehicle 110. The server(s) 120 may process the audio data using voice activity detection to determine speech of the driver represented in the audio data. The server(s) 120 may use acoustic localization techniques (as known in the art) to ensure the speech originated from a location within the car corresponding to a driver. For example, if the vehicle 110 includes more than one microphone, data received from the microphones may be analyzed to determine approximate distance to a sound's point of origin based on time and amplitude differences between sounds captured by the different microphones. The server(s) 120 may then process the portions of the received audio data corresponding to driver speech to determine whether audio characteristics of the speech correspond to stored audio characteristics corresponding to drowsy speech characteristics. To determine drowsy speech characteristics, audio data corresponding to speech of various users of the system may be analyzed to determine voiced duration, unvoiced duration, and response time. Mel-Frequency-Cepstral-Coefficients (MFCC) may then be used as the features for silence, voiced, and unvoiced parts of speech in the audio data. These parts of speech may be segregated using a Gaussian Mixture Model (GMM) classifier. The results may be validated with an EEG based parameter (i.e., relative energy of a band which increases with fatigue).

The server(s) 120 may determine audio characteristics of received audio data. Alternatively, the vehicle computing system (or a vehicle server(s) 925) may determine audio characteristics of audio data corresponding to audio received by the vehicle computing system. The vehicle computing system (or the vehicle server(s) 925) may then send audio characteristic data corresponding to the audio characteristics, to the server(s) 120. The server(s) 120 may then use the received audio characteristic data to determine whether an operator is drowsy.

The audio data that the server(s) 120 receives from the vehicle computing system may have resided in a rolling buffer implemented by the vehicle computing system. By implementing a rolling buffer, the vehicle computing system is able to send audio data corresponding to a previous time to which the other sensor data, relied on by the drowsy detection component 418, corresponds. This helps the server(s) 120 determine whether the driver was drowsy with respect to the situation represented by the amalgamation of the sensor data processed by the drowsy detection component 418, and not a later time (e.g., a current processing time if the server(s) 120 is experiencing some latency).

The context data may also represent characteristics of the driver, such as gender, age, etc. After determining the speech in audio data originated from a driver of the vehicle 110, the server(s) 120 may determine characteristics of the speech corresponding to stored speech characteristics associated with a user profile. The server(s) 120 may determine characteristics (e.g., gender, age, etc.) represented in the user profile. Such characteristics may be useful in determining whether a driver is drowsy because individuals of different ages and/or genders may become drowsy faster or slower than other individuals.

The context data may also represent cell phone usage of the driver. The server(s) 120 may determine a cellular service provider associated with a phone or other device (e.g., a tablet) represented in a user profile associated with the driver. The server(s) 120 may request cell phone usage data, associated with the driver, from the cellular service provider's system. The requested cell phone usage data may correspond to the past 5 minutes, 2 minutes, or other time frame relevant to determining the current drowsiness of a driver. Such data may be useful in determining whether a driver is drowsy because, for example, if the cell phone usage data represents the driver recently (e.g., with a threshold length of time) sent a message or email, the server(s) 120 may determine the driver is not drowsy but, instead, was temporarily distracted. Conversely, if the cell phone usage data represents the driver has not used their phone recently, the server(s) 120 may determine the driver was not temporarily distracted but, rather, is drowsy.

The context data may also represent a time when the driver woke up that day. The server(s) 120 may determine an electronic alarm, or electronic device implementing an electronic alarm, represented in a user profile associated with the driver. The server(s) 120 may determine an earliest alarm set for the present day (e.g., the calendar day in which the herein described processing is being performed) to determine a wake up time of the driver. The server(s) 120 may determine how long the driver has been awake based on the wake up time (taking into account time zone changes as necessary) and a current time experienced by the driver (taking into account time zone changes as necessary). Such data may be useful in determining whether a driver is drowsy because the long a driver is awake the drowsier the driver may be, or the easier the driver may become drowsy based on other factors (e.g., the weather). For example, a driver may become drowsy more easily as a function of how long the driver has been awake and whether the driver is experiencing rain.

The context data may also represent previous speech captured by the vehicle 110. The server(s) 120 may identify vehicle profile data associated with the vehicle 110. The server(s) 120 may then determine audio data associated with the vehicle profile data. The audio data may correspond to previous utterances spoken by operators of the vehicle 110. The server(s) 120 may analyze the audio data to determine speech pattern data. The server(s) 120 may compare the speech pattern data to audio data corresponding to contemporaneous speech of the operator of the vehicle 110 to determine whether the operator is impaired or whether the contemporaneous speech contains characteristics found in routine speech captured by the vehicle 110.

The context data may also represent previous speech of the operator of the vehicle 110. The server(s) 120 may determine an identity of the operator of the vehicle 110 using various techniques as described herein (e.g., using image data, audio data, etc.). For example, the server(s) 120 may determine audio data, received from the vehicle computing device of a vehicle server(s) 925, includes audio characteristics corresponding to stored audio characteristics associated with operator profile data. The server(s) 120 may determine audio data associated with the operator profile data. The audio data may correspond to previous utterances of the operator received by the server(s) 120 from devices other than the vehicle computing device of the vehicle server(s) 925. The server(s) 120 may analyze the audio data to determine speech pattern data. The speech pattern data may represent, for example, with the operator has a lisp, whether the operator routinely slurs his/her speech, or whether the operator has some other speech impediment. The server(s) 120 may compare the speech pattern data to audio data corresponding to contemporaneous speech of the operator to determine whether the operator is impaired or whether the contemporaneous speech contains characteristics found in the operator's routine speech.

If the server(s) 120 determines the driver is not drowsy based at least in part on the context data, the server(s) 120 ceases (504) processing with respect to driver drowsiness until further sensor data and/or alert data is received from a vehicle (not necessarily the vehicle 110) associated with the server(s) 120. If the server(s) 120 determines the driver is drowsy based at least in part on the context data, the server(s) may perform (506) one or more actions to re-engage the driver in operating the vehicle 110.

Figure 6:
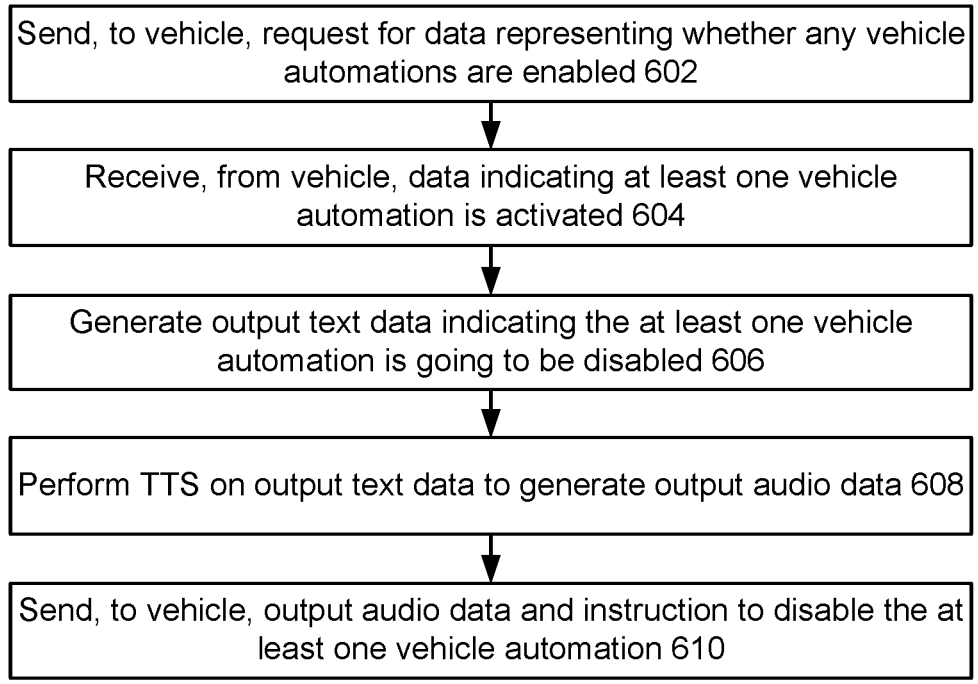
FIG. 6 is a process flow diagram illustrating how a system may disable vehicle automation according to embodiments of the present disclosure.

In an effort to re-engage a driver, regardless of whether the server(s) 120 has confirmed the driver is drowsy, a system may disable vehicle automation in response to confirming the driver is drowsy (as illustrated in FIG. 6). One or more of the processes described with respect to FIG. 6 may be performed by a speechlet dedicated to controlling vehicles. The server(s) 120 may send (602) a request to the vehicle computing system for data representing whether any vehicle automations (e.g., cruise control, a self-driving mode, etc.) are enabled. The server(s) 120 may receive (604) data from the vehicle computing system indicating one or more vehicle automations that are enabled. In response, the server(s) 120 may generate (606) output text data indicating the one or more vehicle automations are going to be disabled and may perform (608) text-to-speech (TTS) on the output text data to generate output audio data. The server(s) 120 may send (610), to the vehicle computing system, the output audio data and an instruction to disable the vehicle automation(s). The instruction may direct the vehicle computing system to not disable the vehicle automation until the vehicle computing system has finished outputting audio corresponding to the output audio data. If the instruction directs the vehicle computing system to disable a self-driving mode of the vehicle 110, the instruction may also include a portion directing the vehicle computing system to not disable the self-driving mode until after the vehicle computing system has detecting the driver has placed his/her hands back on the steering wheel of the vehicle 110.

Figure 7:
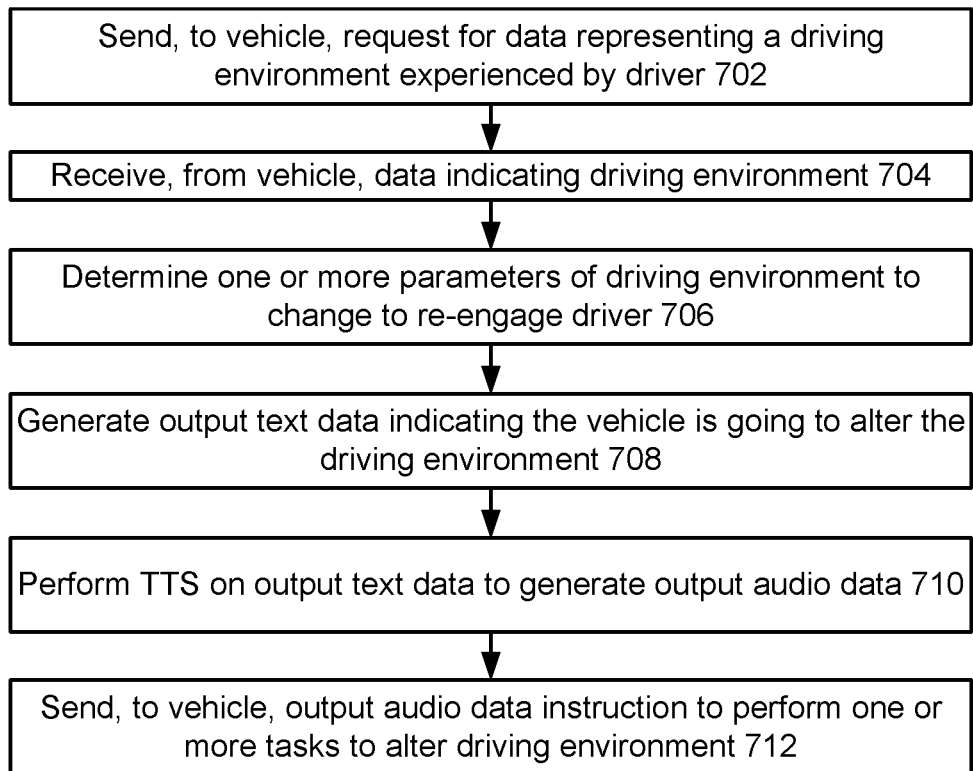
FIG. 7 is a process flow diagram illustrating how a system may cause a vehicle to affect a driving environment experienced by a driver according to embodiments of the present disclosure.

In an effort to re-engage a driver, regardless of whether the server(s) 120 has confirmed the driver is drowsy, a system may also or alternatively cause a vehicle computing system to affect a driving environment experienced by the driver (as illustrated in FIG. 7). The server(s) 120 may send (702) a request to the vehicle computing system for data representing a driving environment experienced by the driver. "Driving environment" or "driving environment experienced by the driver" as used herein refer to the surroundings or conditions in experienced by a driver while operating a vehicle. Such data may, for example, represent a position of one or more of the vehicle's windows, a temperature setting of the vehicle's climate control system, etc. The server(s) 120 may receive (704) data from the vehicle computing system indicating the driving environment experienced by the driver. The server(s) 120 may determine (706) one or more parameters of the driving environment may be changed to re-engage the driver in operating the vehicle. One parameter may correspond to lowering one or more windows of the vehicle. Another parameter may correspond to activating the vehicle's air conditioning system or otherwise decreasing a cabin temperature of the vehicle 110. A further parameter may correspond to activating one or more ceiling lights in the cabin of the vehicle 110. Other parameters are also possible. Such parameters may depend on the type of vehicle. For example, it would not be beneficial to recommend lowering a window or decreasing a cabin pressure if the vehicle is a motorcycle, convertible, or other substantially open vehicle. The server(s) 120 may send a signal to the vehicle to alter a parameter of the vehicle's operation and/or to command the vehicle to take certain actions, for example to safely pull to the side of the road and come to a halt if the vehicle is capable of doing so.

The server(s) 120 may generate (708) output text data indicating the vehicle is going to alter the driving environment and may perform (710) text-to-speech (TTS) on the output text data to generate output audio data. The output text data and output audio data may correspond to a general indication that the driving environment is going to change, such as "I am going to perform some actions to wake you up," for example. Alternatively, the output text data and output audio data may be specific to the determined parameter(s), such as "I am going to roll you driver side window down to wake you up," for example. The server(s) 120 may send (712), to the vehicle computing system, the output audio data and an instruction to perform one or more tasks, corresponding to the one or more parameters, to alter the driving environment. For example, the instruction may direct the vehicle computing system to lower one or more windows of the vehicle 110. For further example, the instruction may direct the vehicle computing system to perform the one or more tasks while or after the vehicle computing system outputs audio corresponding to the output audio data.

Figure 8:
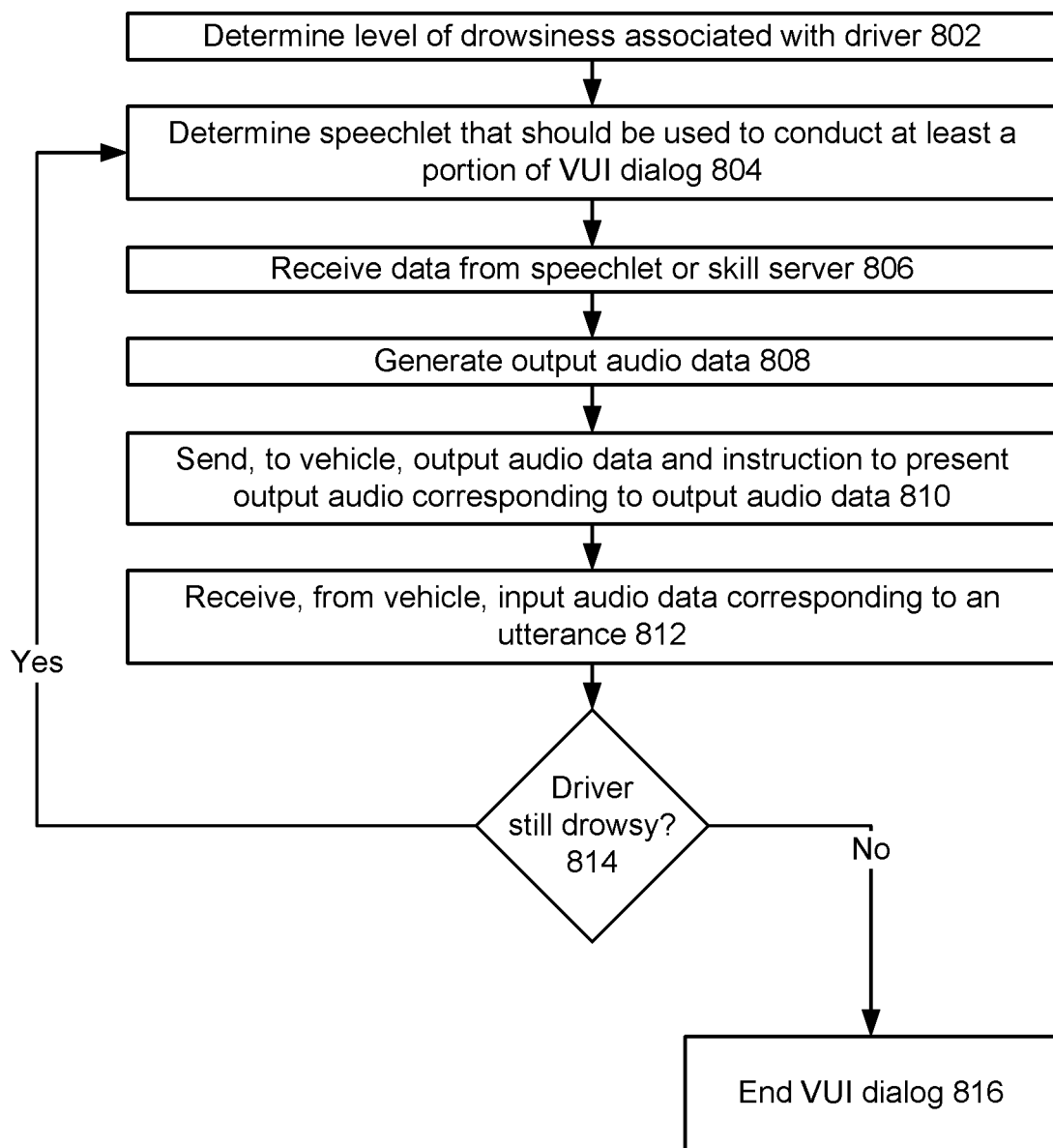
FIG. 8 is a process flow diagram illustrating how a system may engage a driver in a voice user interface dialog according to embodiments of the present disclosure.

In an effort to re-engage a driver, regardless of whether the server(s) 120 has confirmed the driver is drowsy, a system may also or alternatively engage the driver in a VUI dialog (as illustrated in FIG. 8). The server(s) 120 may determine (802) a level of drowsiness associated with a driver. As described above, the server(s) 120 may use a trained machine learning model(s) to determine a driver is drowsy. The server(s) 120 may also determine, using a same or different trained model(s), a level of drowsiness of the driver. For example, the server(s) 120 may use the trained model(s) to determine a drowsiness score indicating a level of drowsiness of the driver. The drowsiness score may be a numeric or binned (e.g., high, medium, low) value. The trained model(s) may take as input various data, such as sensor data originated by the vehicle computing system, context data received by the server(s) 120, user profile data, date/time data (as some drivers may be more likely to be drowsy at night versus in the afternoon), etc.

The server(s) 120 determines (804) a speechlet that should be used to conduct at least a portion of a VUI dialog. The server(s) 120 may determine the speechlet based on the level of drowsiness. For example, the server(s) 120 may determine a speechlet that provides music based on a first drowsiness level, determine a speechlet that provides VUI trivia games based on a second drowsiness level, determine a speechlet that performs communications between two devices of the system (such that users of the devices may perform a 2-way communication) based on a third level of drowsiness, etc. The server(s) 120 may determine other types of speechlets as well, such as a speechlet that enables a driver to verbally post something to a social media account associated with the driver, a speechlet that engages a driver to verbally repeat a tongue twister presented to the driver as audio, etc. The server(s) 120 may also determine a topic of content associated with a system history of the driver, and may determine a speechlet capable of providing data related to the topic.

The server(s) 120 may also determine a speechlet to conduct at least a portion of the VUI dialog based on a user profile of the driver indicating that speechlet should be used when the driver is drowsy. The user profile may indicate a single speechlet that should be used anytime the driver is determined to be drowsy. Alternatively, the user profile may indicate one or more different speechlets that should be used based on the level of drowsiness determined for the driver.

The server(s) 120 may also determine a speechlet to conduct at least a portion of the VUI dialog based on whether other individuals are present in the vehicle 110. The server(s) 120 may determine image data, received from one or more cameras 302 located in an interior of the vehicle 110, includes representations of more than one human. Based thereon, the server(s) 120 may determine which speechlet should perform at least part of the VUI dialog. For example, if the server(s) 120 determines the image data includes representations of more than one human, the server(s) 120 may determine a communications speechlet should not perform the VUI dialog since it may be undesirable to have a voice-based communication occur when other humans are present in the vehicle 110.

The server(s) 120 may also determine a speechlet to conduct at least a portion of the VUI dialog based on image data received from one or more cameras 204 located on an exterior of the vehicle 110. The server(s) 120 may determine the image data includes a representation of a street sign, license plate, establishment, or other identifiable object in front of the vehicle 110. When this occurs, the server(s) 120 may determine a speechlet that is capable of requesting the driver to verbally provide information about the identified object. For example, if the speechlet causes the vehicle computing system to present audio corresponding to "what kind of street sign are you approaching" and the vehicle computing system provides the server(s) 120 with input audio data corresponding to "a stop sign," the server(s) 120 may perform object recognition on the previously received image data to confirm the driver's spoken response is correct. The server(s) 120 may perform ASR and NLU on the input audio data to determine speech processing results (described herein below), and may confirm the driver's response is correct using the speech processing results and the object recognition results.

The server(s) 120 thereafter requests from and receives (806) data from the determined speechlet or a skill server 125 executing a determined skill. The server(s) 120 also generates (808) output audio data. The output audio data may include speechlet/skill generated and/or TTS generated audio data.

The server(s) 120 may perform TTS to generate the output audio data based on the level of drowsiness of the driver. The server(s) 120 may use different TTS parameters (e.g., prosody, pitch, volume, voice selection, etc.) to generate different output audio data. For example, the server(s) 120 vary TTS parameters to adjust a level of "shouting" in output synthesized speech based on how drowsy the driver is. For further example, the server(s) 120 may vary TTS parameters to adjust the length of sentences in output synthesized speech, as lengthier sentences may cause a driver to become drowsier. For yet further example, the server(S) 120 may vary TTS parameters to adjust a tempo the output synthesized speech, as slower tempo synthesized speech may cause a driver to become drowsier.

The server(s) 120 sends (810), to the vehicle computing system, the output audio data and an instruction to present output audio corresponding to the output audio data. The server(s) 120 may also send, to the vehicle computing system, output image data and an instruction to present one or more images prior to or contemporaneously with presenting the output audio. The one or more images may indicate to the driver that the system is going to engage the driver in a VUI dialog. The server(s) 120 cause a wearable device of the driver to vibrate, thereby indicating that the system is going to engage the driver in a VUI dialog.

The vehicle computing system may receive input audio corresponding to speech, generate input audio data corresponding thereto, and send the input audio data to the server(s) 120. The server(s) 120 receives (812) the input audio data and may determine (814) speech in the input audio data was spoken by the driver of the vehicle 110. Such determine may include using acoustic localization techniques (known in the art) to determine the speech originated at a location of the vehicle 110 corresponding to a driver.

The server(s) 120 may assess a level of drowsiness of the driver over the course of a VUI dialog to determine when the driver is no longer drowsy and thereby optionally end the VUI dialog. Thus, the server(s) 120 may determine (814) whether the driver is still drowsy after receiving the input audio data. The server(s) 120 may determine an updated drowsiness level score, as described herein above.

The server(s) 120 may also determine the updated drowsiness level score using the input audio data. For example, the server(s) 120 may determine a prosody of the input audio data and may compare the prosody to prosody of previous speech of the driver to determine the updated drowsiness level score. The previous speech of the driver may correspond to a previous driver input of the VUI dialog. The previous speech of the driver may also or alternatively correspond to speech of the driver not corresponding to the present VUI dialog and/or not originating from the vehicle computing system. For example, the previous speech of the driver may correspond to a previous command the driver spoke to the vehicle 110 or some other system endpoint device. The server(s) 120 may have received data corresponding to the previous speech of the user the same calendar day as the processes described herein are performed, or may have received such data on a previous calendar day.

The server(s) 120 may also determine the updated drowsiness level score using a time receipt associated with the input audio data. For example, the closer a time indicated in the time receipt is to a time when the vehicle computing system presented the output audio, the lower the updated drowsiness level score may be.

If the server(s) 120 determines the driver is still drowsy, the server(s) 120 engages in another turn of the VUI dialog by determining (804) a speechlet that should provide content to the driver. This determined speechlet may be the same or different from the speechlet that provided the previous output data to the server(s) 120. If the server(s) 120 determines the driver is no longer drowsy or is at a level of drowsiness where the driver can adequately operate the vehicle 110, the server(s) 120 may end (816) the VUI dialog.

When there are multiple individuals in the vehicle 110 and the vehicle computing system does not provide the server(s) 120 with input audio data within a threshold amount of time, the server(s) 120 generate content directed to causing a passenger of the vehicle to wake the driver up. For example, the server(s) 120 may generate output text data corresponding to "passenger, the driver appears to be nodding off." The server(s) 120 may perform TTS on the output text data to generate output audio data, and send the output audio data and an instruction to the vehicle computing system to present output audio corresponding to the output audio data.

Figure 9:
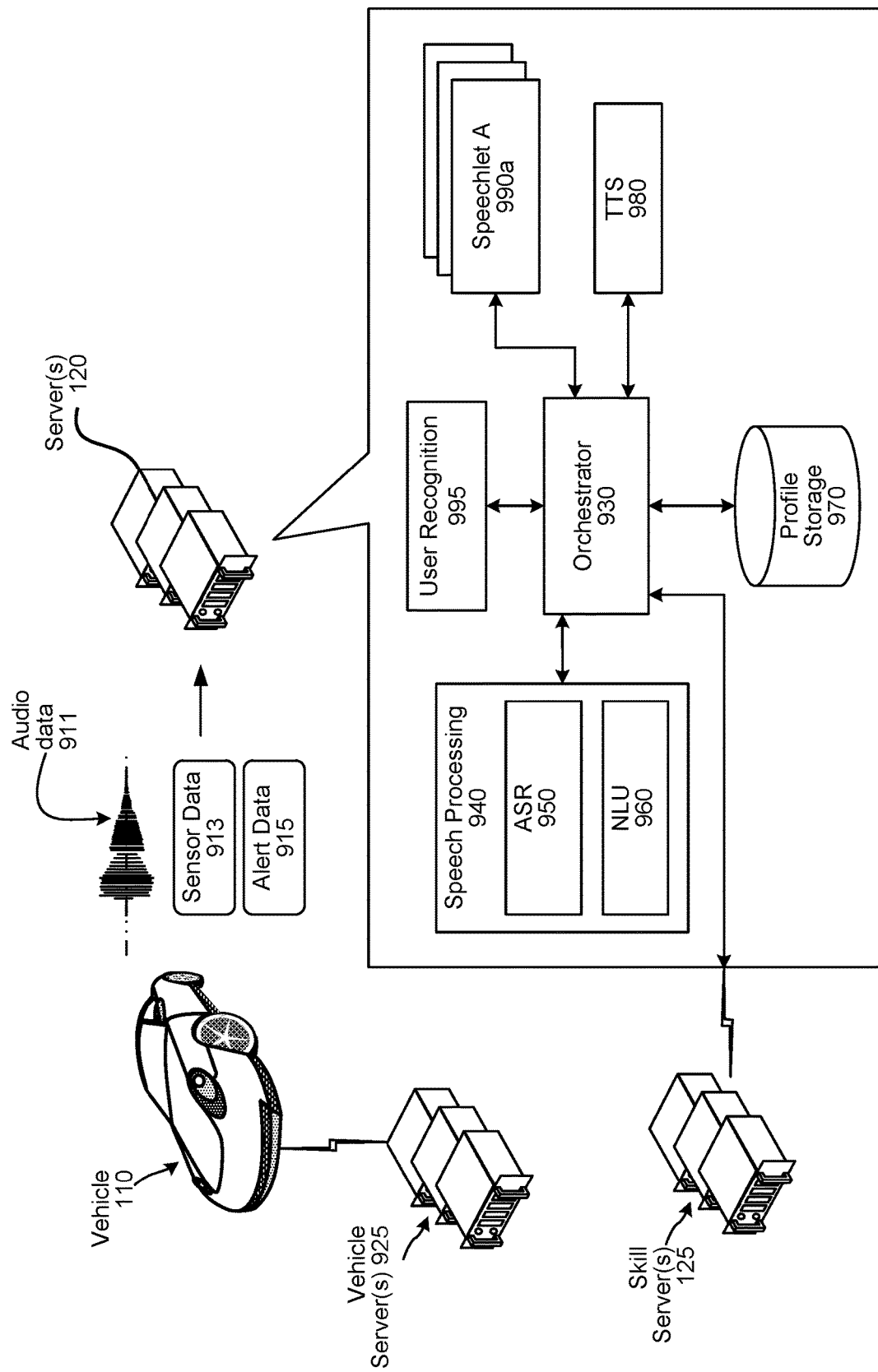
FIG. 9 is a conceptual diagram of components of a system according to embodiments of the present disclosure.

A system according to the present disclosure may operate using various components as described in FIG. 9. The various components illustrated FIG. 9 may be located on a same or different physical devices. Communication between various components illustrated in FIG. 9 may occur directly or across a network(s) 199.

The vehicle computing system may capture audio using an audio capture component, such as the microphone(s) 304. The vehicle computing system sends audio data 911, corresponding to the audio, to the server(s) 120. The vehicle computing system may include a wakeword detection component that detects when input audio includes a spoken wakeword. In some instances, the vehicle computing system may be configured to send audio data to the server(s) 120 (e.g., via the vehicle server(s) 925) when the vehicle computing system detects a spoken wakeword. The vehicle computing system may also send sensor data 913 and/or alert data 915 (e.g., indicating driver impairment, driver drowsiness, etc.) to the server(s) 120. The alert data 915 may be created by a computing component of the vehicle based on sensor data 913, thus enabling the vehicle 110 to process the sensor data 913 (for example using a trained model) to determine the driver state. The vehicle 110 may thus send the alert data 915 to the server(s) 120 in lieu of sending sensor data 913. Alternatively, the vehicle 110 may send both the alert data 915 and the sensor data 913 to the server(s) 120. The vehicle 110 thus may send some data corresponding to the sensors to the server(s) 120 (either directly or through one or more intermediate devices such as a vehicle server) where the data corresponding to the sensors may include the sensor data 913 and/or the alert data 915.

Upon receipt by the server(s) 120, the audio data 911 may be sent to an orchestrator component 930. The orchestrator component 930 may include memory and logic that enables the orchestrator component 930 to transmit various pieces and forms of data to various components of the system.

The orchestrator component 930 may send the audio data 911 to a speech processing component 940. An ASR component 950 of the speech processing component 940 transcribes the audio data 911 into one or more hypotheses representing speech contained in the audio data 911. The ASR component 950 interprets the speech in the audio data based on a similarity between the characteristics of the audio data corresponding to the speech and pre-established language models. For example, the ASR component 950 may compare the audio data 911 with models for sounds (e.g., subword units such as phonemes) and sequences of sounds to identify words that match the sequence of sounds in the speech represented in the audio data 911. The ASR component 950 may send text data generated thereby to an NLU component 960 of the speech processing component 940. The text data output by the ASR component 950 may include a top scoring hypothesis of the speech represented in the audio data 911 or may include an N-best list including a group of hypotheses of the speech represented in the audio data 911, and potentially respective scores ASR processing confidence scores.

The NLU component 960 attempts to make a semantic interpretation of the phrases or statements represented in the text data input therein. That is, the NLU component 960 determines one or more meanings associated with the phrases or statements represented in the text data based on individual words represented in the text data. The NLU component 960 interprets a text string to derive an intent of the user (e.g., an action that the user desires be performed) as well as pertinent pieces of information in the text data that allow a device (e.g., the vehicle 110, the server(s) 120, the skill server(s) 125, etc.) to complete the intent. For example, if the text data corresponds to "a stop sign" and the text data was generated from audio data received in response to a VUI output, the NLU component 960 may determine the user intended the speech to correspond to a response to the previous VUI output.

The server(s) 120 may include a user recognition component 995. The user recognition component 995 may take as input the audio data 911 and/or text data output by the ASR component 950. The user recognition component 995 determines scores indicating whether speech originated from a particular user. For example, a first score may indicate a likelihood that speech originated from a first user, a second score may indicate a likelihood that the speech originated from a second user, etc. The user recognition component 995 also determines an overall confidence regarding the accuracy of user recognition operations. The user recognition component 995 may perform user recognition by comparing speech characteristics in the audio data 911 to stored speech characteristics of users. The user recognition component 995 may also perform user recognition by comparing biometric data (e.g., fingerprint data, iris data, etc.) received by the system in correlation with the most recently received audio data to stored biometric data of users. The user recognition component 995 may further perform user recognition by comparing image data (e.g., including a representation of at least a feature of a user) received by the system in correlation with the most recently received audio data with stored image data (e.g., including representations of features of users). The user recognition component 995 may perform additional user recognition processes, including those known in the art. Output of the user recognition component 995 may be used to inform NLU component processes as well as processing performed by speechlets 990 and or skills (executed by one or more skill server(s) 125).

The server(s) 120 may include a profile storage 970. The user profile storage 970 may include a variety of information related to individual users, groups of users, etc. that interact with the system. The user profile storage 970 may include one or more customer profiles. Each customer profile may be associated with a different customer identifier (ID). A customer profile may be an umbrella profile specific to a group of users. That is, a customer profile encompasses two or more individual user profiles, each associated with a respective unique user ID. For example, a customer profile may be a household profile that encompasses user profiles associated with multiple users of a single household. A customer profile may include preferences shared by all the user profiles encompassed thereby. Each user profile encompassed under a single customer profile may include preferences specific to the user associated therewith. That is, each user profile may include preferences unique from one or more other user profiles encompassed by the same customer profile. A user profile may be a stand-alone profile or may be encompassed under a customer profile. As illustrated, the user profile storage 970 is implemented as part of the server(s) 120. However, it should be appreciated that the user profile storage 970 may be located proximate to the server(s) 120, or may otherwise be in communication with the server(s) 120, for example over the network(s) 199.

The server(s) 120 may include one or more speechlets 990 configured to perform the herein disclosed, as well as other, processes. The server(s) 120 may also be in communication with one or more skill servers 125 that execute one or more skills configured to perform the herein disclosed, as well as other, processes. To enable a speechlet 990 or skill to execute, orchestrator component 930 may send output from the NLU component 960 (e.g., text data including tags attributing meaning to the words and phrases represented in the text data), and optionally output from the user recognition component 995 and/or data from the profile storage 970, to the speechlet 990 and/or skill server(s) 125 implementing the skill.

The server(s) 120 may also include a TTS component 980 that synthesizes speech (e.g., generates audio data) corresponding to text data input therein. The TTS component 980 may perform speech synthesis using one or more different methods. In one method of synthesis called unit selection, the TTS component 980 matches text data against one or more databases of recorded speech. Matching units are selected and concatenated together to form audio data. In another method of synthesis called parametric synthesis, the TTS component 980 varies parameters such as frequency, volume, and noise to create an artificial speech waveform output. Parametric synthesis uses a computerized voice generator, sometimes called a vocoder.

The various components (930/940/950/960/980/990/995) of the server(s) 120 may exist in software, hardware, firmware, or some combination thereof.

The system of the present disclosure may also include vehicle servers 925 that communicate with vehicles 110 via wireless communications, such as WiFi, Bluetooth, etc. A vehicle server(s) 925 may receive data (e.g., sensor data 913 and/or the alert data 915) from the vehicle 110 and transmit the data to components of the server(s) 120 via a speechlet 990. Data sent between the vehicle server(s) 925 and the server(s) 120 may include a vehicle ID (e.g., so the server(s) 120 knows the endpoint vehicle), a driver name, a driver ID, etc. A vehicle 110 associated with a vehicle server(s) 925 may be referred to as a vehicle client device.

The server(s) 120 may only execute when the server(s) 120 receives audio data corresponding to user input from the vehicle 110. As the server(s) 120 processes the audio data, the server(s) 120 may determine operator drowsiness and store data indicating points in time when the operator has been determined drowsy. For example, the server(s) 120 may determine the operator is drowsy and determine the level of drowsiness is below a threshold such that the server(s) 120 need not engage the operator but, rather, can simply maintain a log of the operator's drowsiness (e.g., store such drowsiness data with a timestamp associated with the vehicle 110 and the operator's system user ID).

At some point, the vehicle server(s) 925 may determine an operator of the vehicle is impaired (independently of the server(s) 120 determinations). The vehicle server(s) 925 may send a signal to the server(s) 120, with the signal requesting the server(s) 120 indicate whether the operator is drowsy. The server(s) 120 may determine an amount of time since the most recently stored timestamp is within a threshold amount of time (e.g., indicating that the drowsiness data is not stale) and may send data to the vehicle server(s) 925 indicating the last time the server(s) 120 determined the operator was drowsy (and potentially a level of drowsiness). The vehicle server(s) 925 may use the received data to determine whether the operator is in fact drowsy. If the vehicle server(s) 925 determines the operator is drowsy based on the received data, the vehicle server(s) 925 may send an instruction to the server(s) 120 to engage a speechlet(s) 990 to engage with the operator (e.g., through a VUI, causing the vehicle 110 to perform operations, etc. as described herein). Rather than sending the instruction to the server(s) 120, if the vehicle server(s) 925 determines the operator is drowsy based on the received data, the vehicle server(s) 925 may cause the vehicle 110 to perform operations (e.g., change climate control, roll down windows, etc.) as described herein.

The vehicle server(s) 925 and/or the server(s) 120 may resided in the vehicle 110, in a cloud computing environment, or some combination thereof. For example, the vehicle 110 may include computing equipment, some portion of which is configured with all/some of the components/functionality of server(s) 120 and another portion of which is configured with all/some of the components/functionality of vehicle server(s) 925. The vehicle may then perform a variety of functions on its own (such as when remote communications are unavailable), and/or may communicate (when capable) with remote based vehicle server(s) 925 and/or the server(s) 120 to perform other functions. Alternatively, all of the functionality may reside on the vehicle 110 or remotely.

Figure 10:
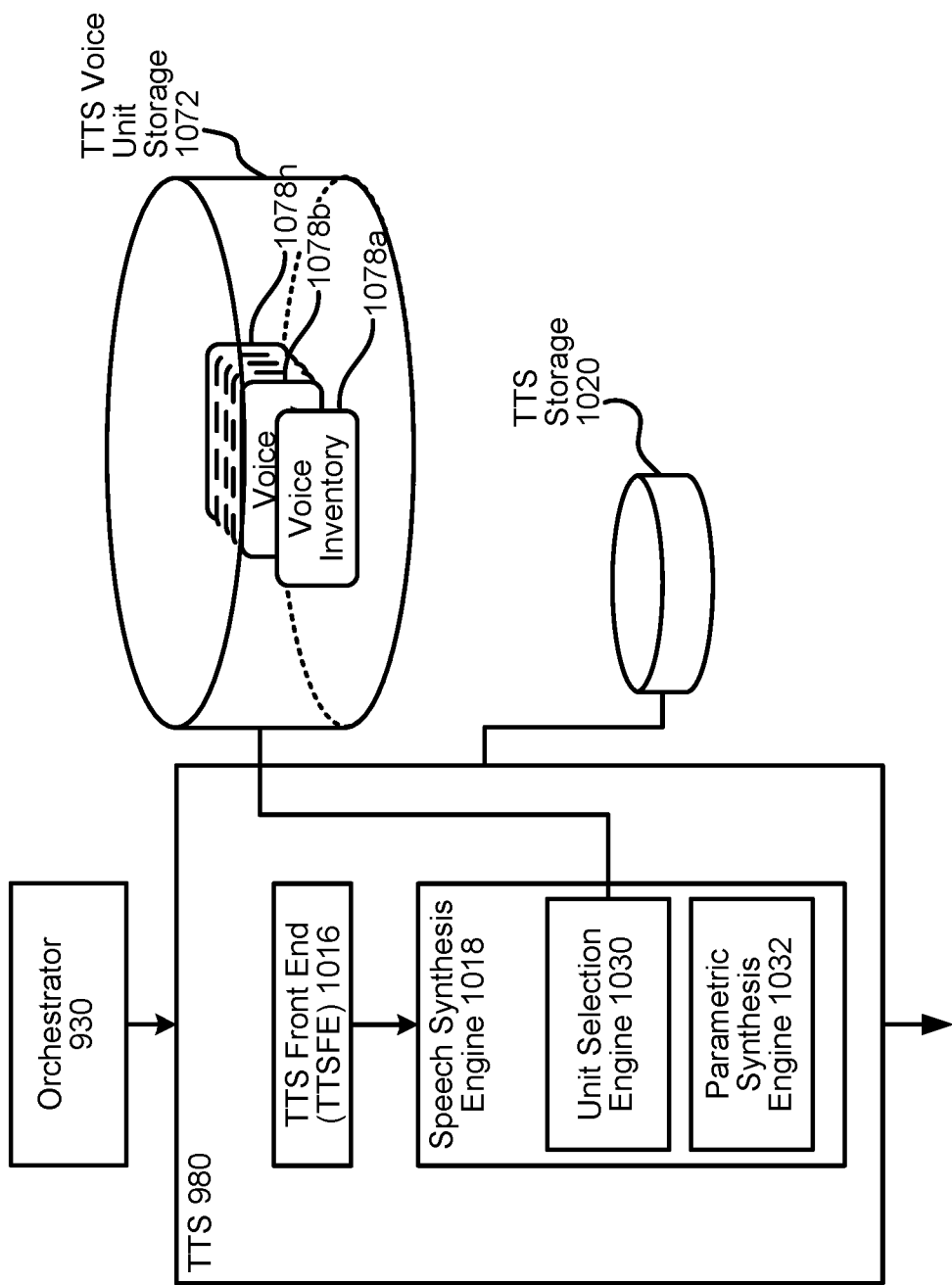
FIG. 10 is a conceptual diagram of how text-to-speech processing is performed according to embodiments of the present disclosure.

FIG. 10 illustrates how TTS processing may be performed. The TTS component 980 includes a TTS front end (TTSFE) 1016, a speech synthesis engine 1018, and a TTS storage 920. The TTSFE 1016 transforms input text data (e.g., from the orchestrator component 930) into a symbolic linguistic representation for processing by the speech synthesis engine 1018. The TTSFE 1016 may also process tags or other data input to the TTS component 1014 that indicate how specific words should be pronounced. The speech synthesis engine 1018 compares annotated phonetic units and information stored in the TTS storage 1020 for converting the input text data into speech (i.e., audio data). The TTSFE 1016 and the speech synthesis engine 1018 may include their own controller(s)/processor(s) and memory, or they may use the controller/processor and memory of the server(s) 120 or another device, for example. Similarly, the instructions for operating the TTSFE 1016 and the speech synthesis engine 1018 may be located within the TTS component 980, within the memory and/or storage of the server(s) 120, or within an external device.

The TTSFE 1016 may include modules for performing text normalization, linguistic analysis, and linguistic prosody generation. During text normalization, the TTSFE 1016 processes the input text data and generates standard/normalized text data, converting such things as numbers, abbreviations (e.g., Apt., St., etc.), and symbols ($, %, etc.) into the equivalent of written out words.

During linguistic analysis the TTSFE 1016 analyzes language in the normalized text data to generate a sequence of phonetic units corresponding to the text data. This process may be referred to as phonetic transcription. Phonetic units include symbolic representations of sound units to be eventually combined and output by the system as synthesized speech. Various sound units may be used for dividing text data for purposes of speech synthesis. The TTS component 980 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system, for example in the TTS storage 1020. As part of linguistic analysis, the TTSFE 1016 may also identify different grammatical components such as prefixes, suffixes, phrases, punctuation, syntactic boundaries, or the like. The TTS component 980 may use such grammatical components to craft a natural sounding audio waveform output. The language dictionary may also include letter-to-sound rules and other tools that may be used to pronounce previously unidentified words or letter combinations that may be encountered by the TTS component 980. Generally, the more information included in the language dictionary, the higher quality the speech output.

Based on the linguistic analysis, the TTSFE 1016 may perform linguistic prosody generation where the phonetic units are annotated with desired prosodic characteristics, also called acoustic features, which indicate how the desired phonetic units are to be pronounced in the eventual output speech. During this stage, the TTSFE 1016 may consider and incorporate any prosodic annotations that accompanied the text data input to the TTS component 980. Such acoustic features may include pitch, energy, duration, and the like. Application of acoustic features may be based on prosodic models available to the TTS component 980. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 1016, referred to as a symbolic linguistic representation, may include a sequence of phonetic units annotated with prosodic characteristics. This symbolic linguistic representation may be sent to the speech synthesis engine 1018, also known as a synthesizer, for conversion into an audio waveform of speech for output to an audio output device and eventually to a user. The speech synthesis engine 1018 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, a unit selection engine 1030 matches the symbolic linguistic representation created by the TTSFE 1016 against a TTS voice unit storage 1072 storing one or more voice inventories 1078. The unit selection engine 1030 matches the symbolic linguistic representation against spoken audio units in the TTS voice unit storage 1072. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the TTS voice unit storage 1072, the unit selection engine 1030 may match units to the input text data to create a natural sounding waveform. The TTS voice unit storage 1072 may include multiple examples of phonetic units to provide the system with many different options for concatenating units into speech. One benefit of unit selection is that, depending on the size of the TTS voice unit storage

1072, a natural sounding speech output may be generated. As described above, the larger the TTS voice unit storage 1072, the more likely the system will be able to construct natural sounding speech.

In another method of synthesis, called parametric synthesis, parameters such as frequency, volume, and noise are varied by a parametric synthesis engine 1032, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce synthesized speech audio data output.

Parametric speech synthesis may be performed as follows. The TTS component 980 may include an acoustic model(s), or other models, which may convert a symbolic linguistic representation into a synthetic acoustic waveform of the input text data based on audio signal manipulation. The acoustic model(s) includes rules which may be used by the parametric synthesis engine 1032 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 1016.

The parametric synthesis engine 932 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 1018, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create customized speech output of the system, the TTS voice unit storage 1072 may be configured with multiple voice inventories 1078, where each voice inventory is configured with a different "voice." Such voice inventories may also be linked to user profiles. For example, one voice inventory may be stored to be used to synthesize whispered speech (or speech approximating whispered speech), another voice inventory may be stored to be used to synthesize excited speech (or speech approximating excited speech), and so on. To create the different voice inventories, a multitude of TTS training utterances may be spoken by an individual and recorded by the system. The TTS training utterances used to train a TTS voice inventory may be different from the training utterances used to train an ASR system. The audio associated with the TTS training utterances may then be split into small audio segments and stored as part of a voice corpus. The individual speaking the TTS training utterances may speak in different voice qualities to create the customized voice inventories, for example the individual may whisper the training utterances, say them in an excited voice, and so on. Thus, the audio of each customized voice inventory may match a desired speech quality. The customized voice inventor may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 980 may synthesize speech as normal, but the system, either as part of the TTS component 980 or otherwise, may apply a filter to make the synthesized speech take on the desired speech quality. In this manner a traditional TTS output may be altered to take on the desired speech quality.

During runtime the TTS component 980 may receive text data for speech synthesis along with an indicator for a desired speech quality of the output speech. The TTS component 980 may then select a voice matching the speech quality, either for unit selection or parametric synthesis, and synthesize speech using the received text data and speech quality indicator.

Figure 11:
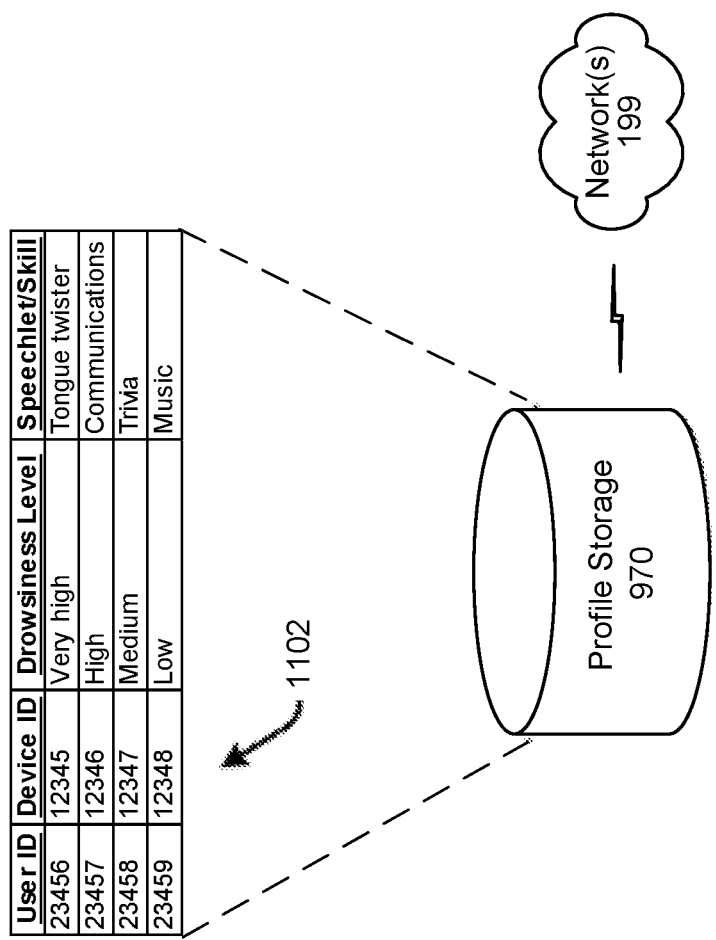
FIG. 11 illustrates data stored and associated with profiles according to embodiments of the present disclosure.

FIG. 11 illustrates the user profile storage 970 that includes data regarding customer profiles as well as individual user profiles 1102. A user profile 1102 may include information indicating various levels of drowsiness and information indicating which type of speechlet should be invoked for each level of drowsiness. A user profile 1102 may additionally include other data not explicitly illustrated.

Figure 12:
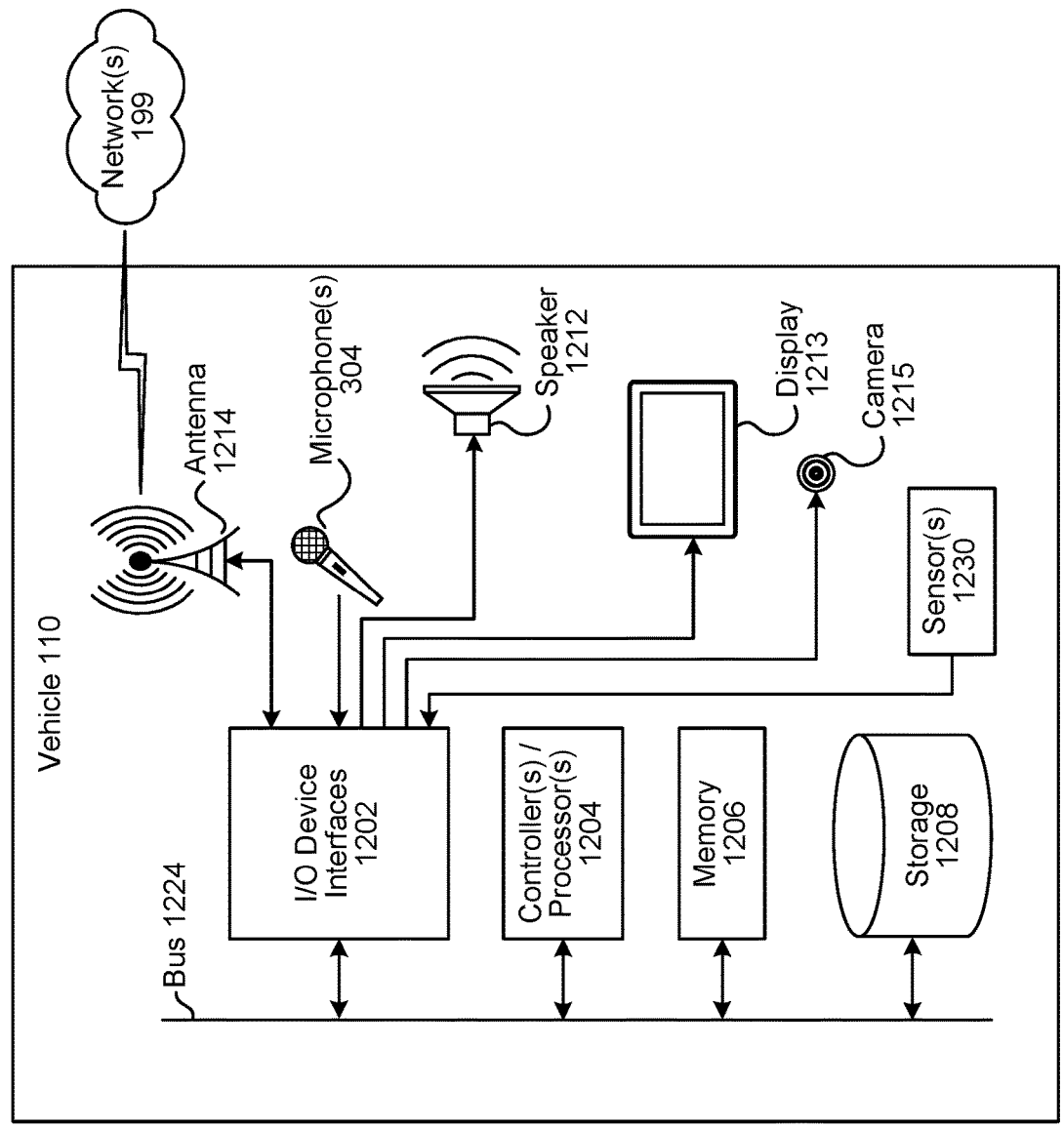
FIG. 12 is a block diagram conceptually illustrating example components of a device according to embodiments of the present disclosure.
Figure 13:
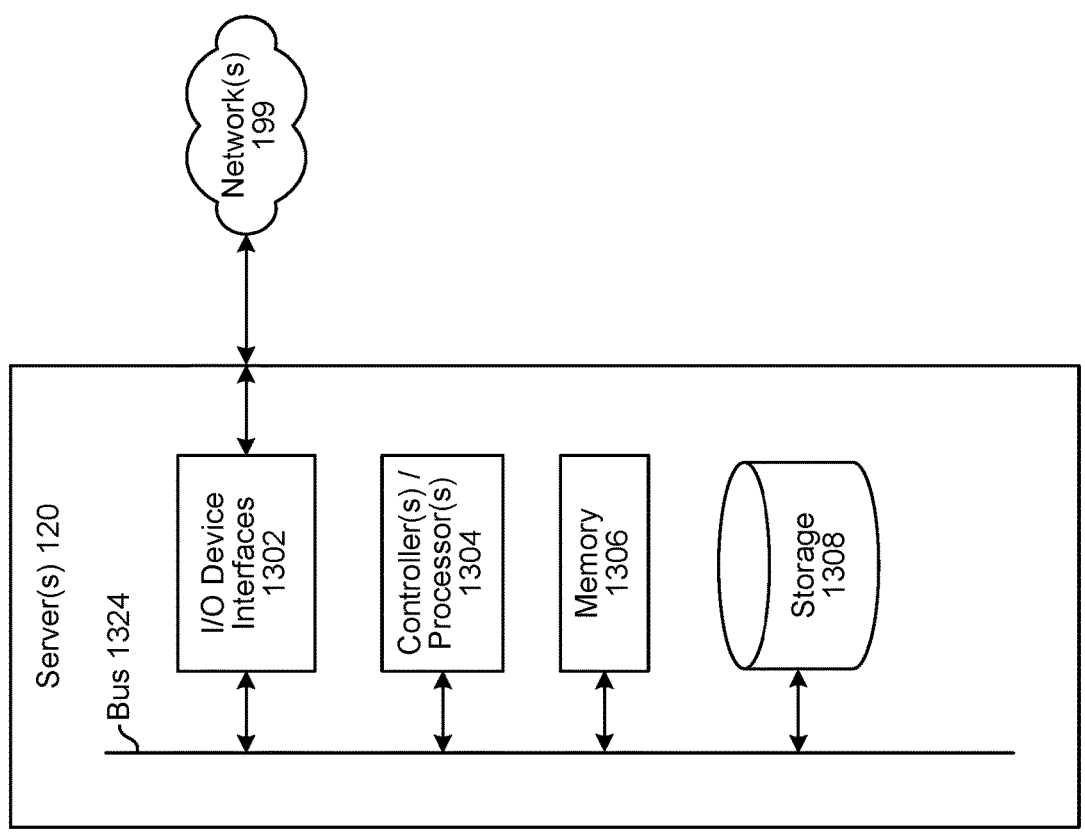
FIG. 13 is a block diagram conceptually illustrating example components of a server according to embodiments of the present disclosure.

FIG. 12 is a block diagram conceptually illustrating a vehicle 110 that may be used with the system. FIG. 13 is a block diagram conceptually illustrating example components of a remote device, such as the server(s) 120, which may assist with ASR processing, NLU processing, or drowsiness processing and driver re-engagement. Multiple servers 120 may be included in the system, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1204/1304), which may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive memory (MRAM), and/or other types of memory. Each device (110/120) may also include a data storage component (1208/1308) for storing data and controller/processor-executable instructions. Each data storage component (1208/1308) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1302/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces (1202/1302), as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to FIG. 12, the vehicle 110 may include input/output device interfaces 1202 that connect to a variety of components such as an audio output component such as a speaker 1212, a wired headset or a wireless headset (not illustrated), or other component capable of outputting audio. The vehicle 110 may also include an audio capture component. The audio capture component may be, for example, a microphone 304 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. An approximate or exact origin of the sound may also be determined if the vehicle 110 includes more than one microphone. The vehicle 110 may also include a display 1213 for presenting visual content. The vehicle 110 may also include one or more cameras 1215 for capturing images of a driving environment and/or environment of the vehicle 110. The vehicle 110 may also include a touchscreen, buttons, and/or other not-illustrated input device.

The vehicle 110 may also include a variety of sensor(s) 1230 which may capture sensor data used by the system to perform various functions, such as distracted or drowsy driver detection. The sensor(s) may include sensors such as proximity sensors 202, external cameras 204, external microphones, internal cameras 302, internal microphones 304, GPS component 402, compass 404, weather components 406 (such as barometric pressure sensors, temperature sensors (which may measure external temperature, internal cabin temperature, engine temperature, or the like), wind speed sensors, wind direction sensors, rain sensors, or the like), proximity component 408, lane drift component 410, eye tracking component 412, speedometer 414, heartrate component 416, tachometer, odometer, tire pressure sensor, fuel gauge, oil gauge, or other sensors. The sensor data 913 output by these sensors may be used by the various components of the system to perform various operations, such as drowsiness detection.

Via antenna(s) 1214, the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. Through the network(s) 199, the system may be distributed across a networked environment. The I/O device interface (1202/1302) may also include communication components that allow data to be exchanged between devices such as different physical servers in a collection of servers or other components.

The components of the vehicle 110 and the server(s) 120 may include their own dedicated processors, memory, and/or storage. Alternatively, one or more of the components of the vehicle 110 and the server(s) 120 may utilize the I/O interfaces (1202/1302), processor(s) (1204/1304), memory (1206/1306), and/or storage (1208/1308) of the device(s) 110 and server(s) 120, respectively.

The computer-readable media/memory (1206/1306) can include non-transitory computer-readable storage media, which can include hard drives, floppy diskettes, optical discs, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In some implementations, the processor(s) (1204/1304) may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) (1204/1304) may possess its own local memory, which also may store program modules, program data, and/or one or more operating systems.

The computer-readable media/memory (1206/1306) may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media/memory (1206/1306) may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

As noted above, multiple devices may be employed in a single system. In such a multi-device system, each of the devices may include different components for performing different aspects of the system's processing. The multiple devices may include overlapping components. The components of the vehicle 110 and the server(s) 120, as described herein, are exemplary, and may be located as a stand-alone device or may be included, in whole or in part, as a component of a larger device or system.

Figure 14:
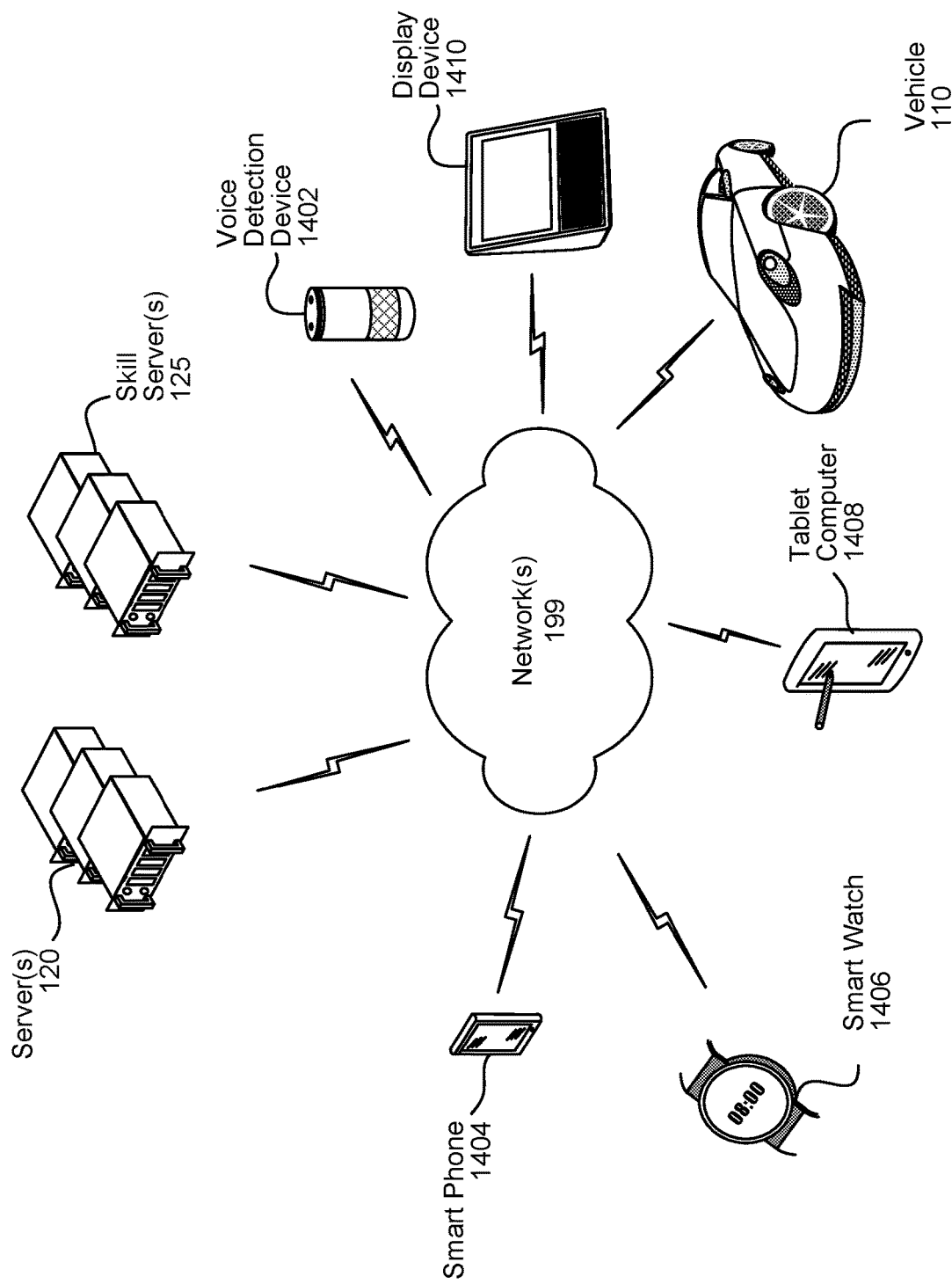
FIG. 14 illustrates an example of a computer network for use with the speech processing system.

As shown in FIG. 14, the system may be configured with various networked devices that may perform some or all of the processes described herein. The system may include devices such as the vehicle 110, a voice-detection device 1402, a smart phone 1404, a smart watch 1406, a tablet computer 1408, and/or a display device 1410. The network(s) 199 may include a local or private network or may include a wide network such as the Internet. Devices may be connected to the network(s) 199 through either wired or wireless connections. The devices may be connected to the network(s) 199 through a wireless service provider, over a WiFi or cellular network connection, or the like. Other devices are included as network-connected support devices, such as the server(s) 120, the skill server(s) 125, or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a vehicle server associated with a vehicle, first data indicating that an operator of a vehicle is drowsy;
   receiving second data generated by the vehicle using sensors that generate data based on physical actions of the vehicle resulting from input by the operator;
   processing the first data and the second data using a machine learned model to determine third data indicating the operator may be unfocused;
   sending, to a first speechlet device, fourth data indicating that the operator may be unfocused;
   receiving, from the first speechlet device, fifth data, indicating a second speechlet device;
   receiving, from the second speechlet device, output text data corresponding to a question to be answered by the operator;

performing text-to-speech (TTS) on the output text data to generate output audio data corresponding to a question to the operator;
causing the vehicle to present output audio corresponding to the output audio data;
receiving input audio data responsive to the output audio; and
determining, based at least in part on the input audio data, a level of focus of the operator of the vehicle.

2. The computer-implemented method of claim 1, further comprising:
after causing the vehicle to present the output audio, receiving sixth data generated by the vehicle using the sensors;
determining, using a machine learned model and based on the sixth data, seventh data indicating that the operator of the vehicle is focused; and
based on the seventh data, closing a processing session associated with the first speechlet device.

3. The computer-implemented method of claim 1, further comprising:
receiving, from the vehicle server, the input audio data corresponding to an utterance responsive to the output audio;
determining audio characteristics associated with the utterance;
determining the audio characteristics correspond to a first drowsiness level of a plurality of drowsiness levels;
determine TTS parameters associated with the first drowsiness level, the TTS parameters corresponding to at least one of pitch, volume, or tempo of to be synthesized speech; and
perform TTS on the output text data using the TTS parameters.

4. The computer-implemented method of claim 1, further comprising:
determining a first time when the operator started driving the vehicle;
determining a difference between the first time and a current time;
determining the difference is equal to or greater than a threshold length of time;
generating second output text data based on the difference being equal or greater than the threshold length of time;
performing TTS on the second output text data to generate second output audio data; and
causing the vehicle to present second output audio corresponding to the second output audio data.

5. A system comprising:
at least one processor; and
at least one memory including instructions that, when executed by the at least one processor, cause the system to:
receive first data associated with one or more sensors of a vehicle, the first data associated with an interaction between an operator and the vehicle;
receive second data corresponding to an environment of the vehicle;
process the first data and the second data to determine output data indicating the operator is potentially unfocused;
based at least in part on the output data, determine, from among a plurality of different speechlet devices, a first speechlet device;
receive, from the first speechlet device, output audio data representing a question to the operator of the vehicle;
cause the vehicle to present output audio corresponding to the output audio data;
receive input audio data responsive to the output audio; and
determine, based at least in part on the input audio data, a level of focus of the operator of the vehicle.

6. The system of claim 5, wherein the instructions, when executed by the at least one processor, further cause the system to:
after determining the operator of the vehicle is unfocused, send third data to a second speechlet device, the third data indicating the operator of the vehicle is unfocused;
receive, from the second speechlet device, fourth data indicating the first speechlet device;
after causing the vehicle to present the output audio, receive fifth data associated with the one or more sensors;
determine, using a machine learned model and based on the fifth data, sixth data indicating that the operator of the vehicle is focused; and
based on the sixth data, close a processing session associated with the second speechlet device.

7. The system of claim 5, wherein the instructions, when executed by the at least one processor, further cause the system to:
receive output text data from the first speechlet device;
select text-to-speech (TTS) parameters based at least in part on the level of focus, the TTS parameters corresponding to at least one of pitch, volume, or tempo of to be synthesized speech; and
perform TTS on the output text data using the TTS parameters to generate the output audio data.

8. The system of claim 5, wherein the instructions, when executed by the at least one processor, further cause the system to:
determine audio characteristics associated with the input audio data; and
determine a second level of focus of the operator based at least in part on the audio characteristics.

9. The system of claim 8, wherein the instructions, when executed by the at least one processor, further cause the system to:
determine, from among the plurality of different speechlet devices, a second speechlet device based at least in part on the second level of focus.

10. The system of claim 5, wherein the instructions, when executed by the at least one processor, further cause the system to:
receive image data from at least one external-facing camera of the vehicle, the image data representing a portion of an environment external to the vehicle; and
perform object recognition processing to determine the image data includes a representation of an object,
wherein the output audio data requests information corresponding to the object.

11. The system of claim 10, wherein the question corresponds to a request to confirm an identity of the object.

12. The system of claim 5, wherein the instructions, when executed by the at least one processor, further cause the system to:
based at least in part on receiving the first data, cause the vehicle to perform an action to focus the operator.

13. The system of claim 5, wherein the instructions, when executed by the at least one processor, further cause the system to:
receive, from the vehicle, the input audio data corresponding to an utterance responsive to the output audio; and perform acoustic localization to determine the utterance originated from an individual at a driver location of the vehicle.

14. The system of claim 5, wherein the instructions, when executed by the at least one processor, further cause the system to:
associating a user profile with the operator of the vehicle;
select the user profile from a plurality of user profiles; and
determine the level of focus using the user profile.

15. The system of claim 5, wherein the instructions, when executed by the at least one processor, further cause the system to:
perform speech processing on the input audio data to determine a response to the question;
determine the response is incorrect; and
perform an action based at least in part on the response being incorrect.

16. A computer-implemented method comprising:
receiving first data associated with one or more sensors of a vehicle, the first data associated with an interaction between an operator and the vehicle;
receiving second data corresponding to an environment of the vehicle;
process the first data the second data to determine output data indicating the operator is potentially unfocused;
based at least in part on the output data, determining, from among a plurality of different speechlet devices, a first speechlet device;
receiving, from the first speechlet device, output audio data representing a question to the operator of the vehicle;
causing the vehicle to present output audio corresponding to the output audio data;
receiving input audio data responsive to the output audio; and
determining, based at least in part on the input audio data, a level of focus of the operator of the vehicle.

17. The computer-implemented method of claim 16, further comprising:
after determining the operator of the vehicle is unfocused, sending third data to a second speechlet device, the third data indicating the operator of the vehicle is unfocused;
receiving, from the second speechlet device, fourth data indicating the first speechlet device;
after causing the vehicle to present the output audio, receiving fifth data associated with the one or more sensors;
determining, using a machine learned model and based on the fifth data, sixth data indicating that the operator of the vehicle is focused; and
based on the sixth data, closing a processing session associated with the second speechlet device.

18. The computer-implemented method of claim 16, further comprising:
receiving output text data from the first speechlet device;
selecting text-to-speech (TTS) parameters based at least in part on the level of focus, the TTS parameters corresponding to at least one of pitch, volume, or tempo of to be synthesized speech; and
performing TTS on the output text data using the TTS parameters to generate the output audio data.

19. The computer-implemented method of claim 16, further comprising:
determining audio characteristics associated with the input audio data; and
determining a second level of focus of the operator based at least in part on the audio characteristics.

20. The computer-implemented method of claim 19, further comprising:
determining, from among the plurality of different speechlet devices, a second speechlet device based at least in part on the second level of focus.

21. The computer-implemented method of claim 16, further comprising:
receiving image data from at least one external-facing camera of the vehicle; and
performing object recognition processing to determine the image data includes a representation of an object,
wherein the output audio data requests information corresponding to the object.

22. The computer-implemented method of claim 21, wherein the question corresponds to a request to confirm an identity of the object.

23. The computer-implemented method of claim 16, further comprising:
based at least in part on receiving the first data, causing the vehicle to perform an action to focus the operator.

24. The computer-implemented method of claim 16, further comprising:
receiving, from the vehicle, the input audio data corresponding to an utterance responsive to the output audio; and
performing acoustic localization to determine the utterance originated from an individual at a driver location of the vehicle.

25. The computer-implemented method of claim 16, further comprising:
associating a user profile with the operator of the vehicle;
selecting the user profile from a plurality of user profiles; and
determining the level of focus using the user profile.

26. The computer-implemented method of claim 16, further comprising:
performing speech processing on the input audio data to determine a response to the question;
determining the response is incorrect; and
performing an action based at least in part on the response being incorrect.

* * * * *